(12) United States Patent
Swindlehurst et al.

(10) Patent No.: US 10,989,210 B2
(45) Date of Patent: Apr. 27, 2021

(54) ANTI-SURGE SPEED CONTROL FOR TWO OR MORE COMPRESSORS

(71) Applicants: Garrett R. Swindlehurst, Buffalo, NY (US); Andrew C. Rosinski, Orchard Park, NY (US); Michael S. Manning, Buffalo, NY (US)

(72) Inventors: Garrett R. Swindlehurst, Buffalo, NY (US); Andrew C. Rosinski, Orchard Park, NY (US); Michael S. Manning, Buffalo, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 86 days.

(21) Appl. No.: 15/645,207

(22) Filed: Jul. 10, 2017

(65) Prior Publication Data
US 2019/0010949 A1      Jan. 10, 2019

(51) Int. Cl.
*F04D 27/00*   (2006.01)
*F04D 25/16*   (2006.01)
(Continued)

(52) U.S. Cl.
CPC .......... *F04D 27/004* (2013.01); *B01D 53/047* (2013.01); *B01D 53/0446* (2013.01);
(Continued)

(58) Field of Classification Search
CPC .............. B01D 53/047; B01D 53/0476; B01D 53/0446; B01D 2257/102; B01D 2256/12;
(Continued)

(56) References Cited

U.S. PATENT DOCUMENTS

| 5,306,116 A | 4/1994 | Gunn et al. |
| 5,347,467 A | 9/1994 | Staroselsky et al. |

(Continued)

FOREIGN PATENT DOCUMENTS

| CN | 1060792 A | 5/1992 |
| CN | 104334888 A | 5/1992 |

(Continued)

OTHER PUBLICATIONS

GMRC Guideline—Release Version 4/3, Application Guideline for Centrifugal Compressor Surge Control Systems; Apr. 2008; Gas Machinery Research Council Southwest Research Institute; GMRC, Gas Machinery Research Council est. 1952; pp. 1-73.

*Primary Examiner* — Peter J Bertheaud
(74) *Attorney, Agent, or Firm* — Ralph J. Mancini

(57) ABSTRACT

The present invention relates to a method and control system to control the speed of centrifugal compressors operating within a vacuum pressure swing adsorption process to avoid an operation at which surge can occur and directly driven by an electric motor that is in turn controlled by a variable frequency drive, while subsequently operating the vacuum pressure swing process between set limits of highest adsorption and lowest desorption pressure. In accordance with present invention an optimal speed for operation of the compressor is determined at which the compressor will operate along a peak efficiency operating line of a compressor map thereof. This speed is adjusted by a feed back speed multiplier when the flow or other parameter referable to flow through the compressor is below a minimum and a feed forward multiplier during evacuation and evacuation with purge steps that multiplies the feed back multiplier to increase speed of the compressor and thereby avoid surge. The speed is then adjusted by a global speed factor which serves to adjust the average speed of the motors over all (Continued)

steps of the repeating cycle such that the process operates within high and low pressure limits.

26 Claims, 5 Drawing Sheets

(51) Int. Cl.
  *F04D 17/10* (2006.01)
  *F04D 25/06* (2006.01)
  *F04D 27/02* (2006.01)
  *B01D 53/047* (2006.01)
  *B01D 53/04* (2006.01)

(52) U.S. Cl.
  CPC ......... *B01D 53/0476* (2013.01); *F04D 17/10* (2013.01); *F04D 25/06* (2013.01); *F04D 25/16* (2013.01); *F04D 27/001* (2013.01); *F04D 27/0261* (2013.01); *B01D 2256/12* (2013.01); *B01D 2257/102* (2013.01); *B01D 2259/402* (2013.01); *B01D 2259/40007* (2013.01)

(58) Field of Classification Search
  CPC .... B01D 2259/402; B01D 2259/40007; F25B 49/022; F04D 27/0261; F04D 27/004; F04D 25/16; F04D 17/10; F04D 25/06; F04D 27/001
  See application file for complete search history.

(56) References Cited

U.S. PATENT DOCUMENTS

| | | |
|---|---|---|
| 5,555,749 A | 9/1996 | Wehrman et al. |
| 5,873,257 A | 2/1999 | Peterson |
| 6,599,093 B2 | 7/2003 | Totsuka |
| 7,094,019 B1 | 8/2006 | Shapiro |
| 7,210,895 B2 | 5/2007 | Kotani et al. |
| 7,650,777 B1 | 1/2010 | Krok et al. |
| 7,785,405 B2 | 8/2010 | Manning et al. |
| 7,824,148 B2 | 11/2010 | Tetu et al. |
| 8,101,308 B2 | 1/2012 | Kirklin |
| 8,567,207 B2 | 10/2013 | Sommer et al. |
| 8,642,200 B2 | 2/2014 | Kirklin |
| 8,657,918 B2 | 2/2014 | Manning et al. |
| 9,086,070 B2 | 7/2015 | Powell |
| 9,702,365 B2 * | 7/2017 | Rosinski ............ F04D 15/0066 |
| 2009/0214393 A1 | 8/2009 | Chekal et al. |
| 2011/0277629 A1 | 11/2011 | Manning et al. |
| 2013/0125746 A1 | 5/2013 | Manning et al. |
| 2013/0323014 A1 * | 12/2013 | Rosinski ............ F04D 15/0066 415/1 |
| 2013/0323082 A1 | 12/2013 | Rosinski et al. |
| 2014/0093396 A1 | 4/2014 | Stanko et al. |

FOREIGN PATENT DOCUMENTS

| | | |
|---|---|---|
| CN | 1218551 A | 6/1999 |
| CN | 1650105 | 8/2005 |
| CN | 101065582 | 10/2007 |
| CN | 101615686 | 12/2009 |
| CN | 101629572 | 1/2010 |
| CN | 101842599 | 9/2010 |
| CN | 101980760 | 2/2011 |
| CN | 102124230 | 7/2011 |
| CN | 103521032 A | 1/2014 |
| CN | 103608085 A | 2/2014 |
| EP | 0743458 A2 | 11/1996 |
| EP | 2 093 188 A2 | 8/2009 |
| WO | 2009/120654 A1 | 10/2009 |
| WO | 2013180919 A1 | 12/2013 |

* cited by examiner

ANTI-SURGE SPEED CONTROL FOR TWO OR MORE COMPRESSORS

FIELD OF THE INVENTION

The present invention provides a method and control system for controlling the speed of two or more centrifugal compressors operating within a vacuum pressure swing adsorption apparatus and directly driven by electric motors to optimize the efficiency of the compressors within the operation of the apparatus and avoid the compressors from entering surge. More particularly, the present invention relates to such a method and system in which the speed is increased during at least those steps of a repeating cycle conducted by the vacuum pressure swing adsorption apparatus where the compressor may encounter surge and in amounts of increase that vary in accordance with the steps being conducted. In addition, the present invention relates to such a method and system in which the relative speed of the compressor is increased or decreased during all steps of a repeating cycle conducted by the vacuum pressure swing adsorption apparatus in order that the pressures inside the apparatus do not exceed a given limit, and such that the pressures for each vessel in the apparatus follow the same repeating pattern to ensure stable operation of the apparatus.

BACKGROUND OF THE INVENTION

In a vacuum pressure swing adsorption process one or more adsorbents are used to adsorb one or more components of a feed stream and thereby produce a purified product stream. A typical process has a series of continuously executed steps in accordance with a repeating cycle. In the repeating cycle, an adsorbent bed containing the adsorbent is alternately used to produce the purified product and then is regenerated. During regeneration, the adsorbed components are desorbed from the adsorbent and then, the adsorbent bed is brought back to a condition in which it can produce product.

In a typical vacuum pressure swing adsorption process designed to make product oxygen from feed air, an adsorbent bed is subject to a ten step process conducted in a repeating cycle. In order to obtain the highest oxygen recovery, a two-bed process is usually conducted. In a first step, the first bed is simultaneously evacuated from the bottom and pressurized from the top with equalization gas delivered from the second bed. Thereafter, high purity product is added to the top of the bed from the oxygen surge tank while feed air is supplied by a feed compressor, typically a blower of the Roots type. In a third step, the bed continues to be pressurized from the bottom via the blower. The bed is now ready to make product and feed air is fed into the bottom of the vessel and product is removed from the top during step 4. In step 5, the product gas is delivered to the oxygen surge tank and some product is refluxed over to the second bed as purge. After production is complete, the blower is unloaded during step 6 and the lower purity gas remaining in the top of the pressurized bed is transferred to the second bed as equalization gas. In a subsequent evacuation steps 7, 8, and 9, waste nitrogen is removed from the bottom of the vessel through the vacuum compressor while there is no flow exiting or entering the top of the vessel. In the last step, the vacuum compressor continues to remove nitrogen from the bottom of the vessel while purge gas is added to the top of the vessel from the second bed. The pressure remains relatively constant during this step due to the fact that the oxygen purge flow is controlled equal to the evacuation flow.

As disclosed in U.S. Pat. No. 7,785,405, centrifugal compressors directly driven by direct drive high-speed permanent magnet motors have been advantageously utilized in vacuum pressure swing adsorption processes. The use of such motors allow for variable-speed operation such that the compressor and high-speed permanent magnet motor combination(s) can accelerate from low-speed to high-speed and decelerate from high-speed to low-speed rapidly, as required by the process. It has been found that this offers a major improvement over the use of centrifugal compressors driven by conventional induction motor/gearbox systems which due to the high inertia of the induction motor cannot accelerate and decelerate quickly. By continuously varying the compressor speeds to match the pressure ratio requirement for the compressor, which is varying because of the pressurizing and evacuating adsorbent beds, the centrifugal compressor used in such a cycle can be operated near, and preferably at, its peak efficiency from 100% design speed or higher to a substantially lower speed, often as low as 30% of design speed.

Compressors are designed to operate within an operating envelope that can be plotted in what is referred to as a compressor map of pressure ratio between outlet pressure and inlet pressure versus flow rate through the compressor. On such a plot, a peak or best efficiency operating line is plotted in which for a given flow rate and pressure ratio, the energy consumption of the compressor is at a minimum. This compressor map can be programmed within a controller used in controlling the speed of the motor and therefore, the compressor. Depending upon the specific step in the vacuum pressure swing adsorption process, which would require a specific pressure ratio across the centrifugal compressor, the controller sends a signal referable to the optimal speed as determined from the compressor map to a variable speed drive that controls the speed of the high-speed permanent magnet motor.

There are, however, situations that can cause the compressor to move off the peak efficiency operating line and into a surge condition. For instance, there can be a lag in the control system, transitional steps in the process being conducted by the vacuum pressure swing adsorption apparatus, changes in ambient conditions and transitioning off the minimum speed line. In all of such situations, the mass flow being compressed can fall for a given speed and pressure ratio to drive the compressor into surge. A surge event is therefore produced by a flow rate through the compressor falling below a minimum flow required at a given speed of the impeller of the compressor that is necessary to maintain stable operation. In a surge event, the head pressure developed by the compressor decreases, causing a reverse pressure gradient at the compressor discharge and a resulting backflow of gas. Once the pressure in the discharge line of the compressor drops below the pressure developed by the impeller, the flow reverses once again. This alternating flow pattern has been found to be an unstable condition that can result in serious damage to the compressor impeller, drive mechanism and components. This condition must be avoided.

In repeating cycles employed in vacuum pressure swing adsorption apparatus, the operational conditions of the compression at which surge can occur will be most critical at high speeds. Additionally, during the evacuation and purge steps and particularly during the transition between the purge and evacuation steps, surge is likely to occur. As will be discussed, the present invention provides a speed control that is particularly designed to avoid surge during low speed operation and during the evacuation and purge steps and the transition between such steps.

In the case of operation of a vacuum pressure swing apparatus comprised of two or more beds, it is critical that the time-dependent pressure trace with each step in the repeating cycle is identical for each vessel in the apparatus. For each vessel in the apparatus, the starting pressure and end pressure for each step must be identical. This condition, which is typically called "balance" among those skilled in the art, is necessary to ensure that the production of the apparatus remains stable and that maximum and minimum pressures in the cycle are not exceeded, as such exceedance can damage the associated compression turbomachinery. In addition, the duration of each step must be the same. This condition, which is typically called "symmetry" among those skilled in the art, is necessary to ensure that the pressure cycles of each vessel stay at the same degree out-of-phase with each other. If this condition is not satisfied, the process can enter a state where it is not taking feed or producing product as designed, which disrupts the continuous production from the apparatus.

For vacuum pressure swing adsorption processes typically used for oxygen production from air, control of the time-dependent pressure trace in the cycle is partially controlled by both the top header valves of the process, which is typical for most pressure-swing adsorption processes. Additionally, for the operation of a vacuum pressure swing apparatus for the production of oxygen from air with variable-speed compressors, the pressure trace in the cycle steps is very strongly affected by the operation of the associated variable-speed compression equipment. This is a consequence of the characteristic operating envelope for the turbomachinery, in which flowrate through the machine depends not only on pressure ratio across the machine, but machine rotational speed.

Therefore, it is imperative, in the operation of variable-speed compressors driven by direct-drive permanent magnet motors, that the compressor speed be adjusted in small increments from one cycle to the next so that certain pressure limits in the process are not exceeded, and so that the compressors do not gradually increase or decrease the cyclic-average pressure in each vessel from one operational cycle to the next. The consequence of deviation from the stable operation condition of a continuous, identical pressure variation cycle in each vessel can be damage to the compressors, including from surge events. Furthermore, ensuring a stable and identical pressure variation cycle in each vessel ensures that production from the vacuum pressure swing apparatus is maximized.

SUMMARY OF THE INVENTION

The present invention provides a method of controlling the speed of two or more centrifugal compressors operating within a vacuum pressure swing adsorption apparatus. The centrifugal compressors are directly driven by an electric motor controlled by a variable frequency drive. In this regard, the term "electric motor" as used herein and in the claims means either a high speed permanent magnet motor or a high speed induction motor. In connection with such method, a parameter referable to a flow rate of gas entering the centrifugal compressor is measured and calculated. The pressure ratio of outlet to inlet pressure of the compressor is also measured and calculated. An optimal speed of the centrifugal compressor is determined based on the pressure ratio and that lies along the peak efficiency operating line of the centrifugal compressor. Additionally, a minimum allowable value of the parameter at which the centrifugal compressor is likely to enter surge conditions at the optimal speed is also determined. A feedback multiplier is determined that when multiplied by the optimal speed will either increase the speed when the parameter is less than the minimum allowable value or will reduce the speed when the parameter is greater than or equal to the minimum allowable value. An overall global speed factor ("GSF") is then applied to the motor speed, which shifts the operation of the compressor slightly away from the optimal speed line for all steps during the repeating cycle, such that the pressure in the vessels at the end of each pressurization and depressurization are equal to the target highest adsorption and lowest desorption pressure set points for the process, respectively. The GSF is generally +/−5% from the optimal speed line; in another embodiment +/−3% from the optimal speed line, and in yet another embodiment +/−2% from the optimal speed line. This "target highest adsorption pressure set point" is the desired value for the maximum pressure reached in the adsorption bed during the steps in which the bed is producing gas product. The "lowest desorption pressure set point" is the desired value for the minimum pressure reached in the adsorption bed during the steps in which the bed is being regenerated in the vacuum pressure swing process. In this manner, the time-dependent pressure trace of the cyclic adsorption process remains within the desired highest and lowest pressures of operation for all cycle steps, thereby preventing a surge event caused by higher than desired pressure ratio across the compressors.

During steps of a repeating cycle conducted by the vacuum swing adsorption apparatus where the centrifugal compressor is at least likely to encounter surge conditions, other than a pure evacuation step and an evacuation with product purge step thereof, a total speed multiplier is set equal to the feedback multiplier multiplied by the global speed factor. During the pure evacuation step and the evacuation with product purge step, the total speed multiplier is calculated by multiplying the feedback multiplier and global speed factor by a feed forward multiplier that will increase the speed during the evacuation step and the evacuation with purge step such that centrifugal compressor is not likely to enter surge conditions. An adjusted speed is calculated at such time by multiplying the optimal speed by the total speed multiplier. A control signal referable at least to the adjusted speed is generated and inputted into the variable frequency drive such that the electric motor and therefore, the centrifugal compressors operates at the adjusted speed. It is to be noted that as used herein and in the claims, the term "pure evacuation step" means a step of the vacuum pressure swing adsorption process in which an adsorbent bed is being evacuated from the bottom of the adsorption bed and valves are set so that no gas is either being introduced into the adsorbent bed or released from the top of the of the adsorption bed. Further, as used herein and in the claims, the term, "evacuation with product purge step" means a step of the vacuum pressure swing adsorption process in which an adsorbent bed is subjected to evacuation at the bottom of the adsorption bed and the introduction of product gas, for instance oxygen, into the top of the bed.

The anti-surge speed control method and system as discussed above and set forth in the claims is equally applicable to apparatus in which a single compressor serves to feed compressed gas to an adsorption bed and evacuate an adsorption bed during the regeneration thereof or where a feed compressor is used for feeding compressed gas to adsorption beds of the apparatus and an evacuation compressor is used in evacuating gases from the adsorption beds. In this regard, where an evacuation compressor is used, it will be a centrifugal compressor that utilizes the above strategy of anti-surge control. The feed compressor may not in such apparatus be a centrifugal compressor and as such, would not be subjected to such anti-surge control. As will be discussed, where the feed compressor is a centrifugal compressor, elements of the anti-surge speed control can be used for the control thereof.

It is understood that generally speaking, the present invention contemplates that the total speed multiplier is set equal to the feedback multiplier multiplied by the global speed factor where the centrifugal compressor is at least likely to encounter surge conditions, other than in the pure evacuation step and the evacuation with product purge step thereof. The present invention specifically contemplates, at points within the repeating cycle where surge conditions are unlikely to be encountered, the control signal that is inputted into the variable frequency drive will have the effect of removing power from the electric motor. In this regard, the vacuum pressure swing adsorption process can use a single compressor to feed compressed gas to an adsorbent bed and another single compressor to evacuate gases from the adsorbent bed. In such case, the repeating cycle can include a feed with equalization step subsequent to the evacuation with product purge step, a feed with product repressurization step following the feed with equalization step and an equalization step prior to the pure evacuation step. During the feed with equalization step, the equalization step and initiation of the feed with product repressurizaton step, the control signal is referable to a non-operational speed such that when the control signal is inputted into the variable frequency drive, electrical power is not applied to the electric motor. However, when a predetermined value of the pressure rise across the compressor is obtained during the feed with product repressurization step, the control signal is again referable to the adjusted speed such that the electric motor and therefore, the compressor operates at the adjusted speed. It is to be noted, however, that the present invention also contemplates and intends to cover within the appended claims an embodiment in which in steps of the repeating cycle, other than the pure evacuation step and the evacuation with product purge step, the total speed multiplier is always set equal to the feedback multiplier multiplied by the global speed factor and the control signal is always referable to the adjusted speed. Furthermore, in a multi-adsorbent bed apparatus that uses dedicated feed and evacuation compressors, the repeating cycle can include a falling pressure equalization step and a rising pressure equalization step subsequent to the evacuation with product purge step. During the falling pressure equalization step and the rising pressure equalization step, the control signal is referable to a non-operational speed such that electrical power is not applied to the electric motor driving with the evacuation compressor. When a predetermined pressure ratio is obtained during the falling pressure equalization step, the control signal is again set referable to the adjusted speed such that the evacuation compressor operates at the adjusted speed.

Each time the feedback multiplier is determined, the feedback multiplier can be stored. When the parameter is less than the minimum allowable value, the feedback multiplier is determined by adding to a last stored value of the feedback multiplier a speed correction factor. When the parameter is greater than or equal to the minimum allowable value, the feedback speed multiplier is calculated by dividing the last stored value of the feedback multiplier by a proportionality constant. The proportionality constant is set equal to a value greater than 1.0 when the last stored value of the feedback multiplier is greater than or equal to 1.0 or 1.0 when the last stored value of the feedback multiplier is less than 1.0.

The feed forward multiplier can be a function of the pressure ratio. The function can have a maximum value of the feed forward multiplier at a predetermined pressure ratio at which or directly before which the centrifugal compressor will likely enter surge conditions during a transition between the evacuation step and the purge step. The function will have decreasing values of the feed forward multiplier at pressure ratios greater than or less than maximum value. The maximum valve has a magnitude preselected such that when the maximum valve is multiplied by the optimal speed at the predetermined pressure ratio the resulting speed will prevent the centrifugal compressor from entering surge conditions. The function can be a Gaussian function.

The parameter or flow rate of the fluid stream passing through each centrifugal compressor can be calculated by measuring the pressure difference measured at two points in the shroud of the centrifugal compressor that are successively closer to an impeller thereof. The shroud or stationary housing for the impeller of a centrifugal compressor has a minimum diameter. This minimum diameter can be used similar to an orifice plate to calculate flow through the compressor. By measuring the difference in fluid pressure across tappings upstream and downstream of the minimum diameter, the flow rate can be obtained from known orifice plate equations. During each of the time intervals, a pressure difference error is calculated and stored by subtracting the minimum allowable value from the current value of the pressure difference. The speed correction factor of the feedback multiplier is calculated during each of the time intervals through proportional integral control comprising adding a proportional term to an integral term, the proportional term calculated by multiplying a gain factor by a difference between the pressure difference error and a prior pressure difference error calculated in a prior time interval and dividing the difference by the time interval. The integral term is calculated by dividing the gain factor by an integral reset time and multiplying a resultant quotient thereof by the pressure difference error. The parameter or flow rate of the fluid stream passing through each centrifugal compressor can be measured using other means of direct flow measurement, such as rotameters based on the variable area effect or flowmeters based on rotation of an impeller. Alternatively, other indirect means of flow measurement may also be used to calculate the parameter, such as pressure measurements across a venturi tube situated within the fluid stream passing through each centrifugal compressor or on a slipstream of said fluid stream, or using pitot tubes to measure pressure within the fluid stream thereof.

After the feedback and feedforward multipliers have been added to ensure safe operation of the compressor away from the surge limit, a global speed factor (GSF) adjustment is applied to the machine to ensure operation of the cyclic vacuum pressure swing apparatus between desired pressure limits. The purpose of the GSF is twofold: firstly, to ensure that pressures either too high or too low are not achieved in the vessels of the apparatus, which would cause a surge event in a compressor which can no longer increase its speed; secondly, to ensure that from one operational cycle to the next, the same cyclic pressure trace is achieved in each step of the cycle for each vessel. In order to ensure that the vessels of the process achieve a stable pressure trace, and that they do not either rise or fall in average pressure to an unsafe operating condition for the associated compressors, the overall flow to the vessels needs to be adjusted continuously to respond to process fluctuations in other equipment of the apparatus and to varying ambient conditions. By adjusting the target speed for the compressors slightly up or down during the cycle, the flowrate through each compressor can be slightly modified with each repetition of the process cycle to ensure stability, balance, and symmetry in the cyclic adsorption process is achieved.

The GSF is calculated based on a feedback control loop interacting with pressure measurements from the process vessels of the apparatus. For a compressor which is in service to increase the pressure of a vessel, the pressure of the vessel at the end of pressure rise is recorded and compared to a target value, which is the target highest adsorption pressure set point. If the measurement exceeds the target, then too much flow was supplied to the vessel for the current cycle, and the GSF is reduced for the next cycle. Likewise for a compressor which is decreasing the pressure of a vessel in the cycle, the pressure of the vessel at the end of falling pressure is recorded and compared to a target value. If the measurement exceeds the target, then not enough flow was removed during the current cycle, and the GSF is increased for the next cycle.

Since the GSF is applied to adjust the speed of the compressors for every step in the cycle, it effectively reduces or increases the average speed of the compressors that are constantly varying in speed during the process. By using pressure measurements in the vessels of the apparatus as feedback to control the value of the GSF, the average amount of gas entering and leaving each vessel is varied continuously from one cycle to the next to ensure that the cyclic pressure trace achieved in the vacuum pressure swing process are within limits and stable across many cycles.

In some embodiments of the present invention, it may be advantageous to assign the same GSF associated with the speed of a given compressor to each vessel in the process. In this case, there will be one GSF for each compressor of the apparatus. In other embodiments, it may be more advantageous to use a different GSF associated with each compressor and vessel pair. For an example of a two-vessel pressure-swing process driven by two different compressors, there will be four different GSF in this case. The latter case is advantageous when the embodiments of the present invention are applied to the production of oxygen from air using a VPSA process, as there are often variations between the nitrogen capacity of the adsorbent from one vessel to another. Varying the speed of each machine-vessel pair across all steps of operation where they are fluidly connected, therefore, can ensure that the balance criterion is maintained for the process.

The present invention also provides a control system for controlling speed of a centrifugal compressor operating within a vacuum pressure swing adsorption apparatus and directly driven by an electric motor controlled by a variable frequency drive. The control system is provided with means for sensing a parameter referable to a flow rate of gas entering the centrifugal compressor. Pressure transducers are positioned to sense pressure at an inlet and an outlet of the centrifugal compressor. In addition, the control system is provided with means for sensing pressure of the associated vessels of the vacuum pressure swing apparatus.

A controller is provided that is responsive to the parameter sensing means, the pressure transducers and steps of a repeating cycle conducted by the vacuum pressure swing adsorption apparatus. The controller has a control program that is programmed to calculate a pressure ratio of the pressures of the outlet to inlet of the centrifugal compressor. The control program also determines an optimal speed of the centrifugal compressor based on the pressure ratio and that lies along the peak efficiency operating line of the centrifugal compressor. A minimum allowable value of the parameter at which the centrifugal compressor is likely to enter surge conditions at the optimal speed is determined by the controller along with a feedback multiplier that when multiplied by the optimal speed will either increase the speed when the parameter is less than the minimum allowable value or will reduce the speed when the parameter is greater than or equal to the minimum allowable value. A total speed multiplier is set equal to the product of the feedback multiplier and global speed factor during the steps of the repeating cycle where the centrifugal compressor is at least likely to enter surge conditions, other than a pure evacuation step and an evacuation with product purge step thereof. The total speed multiplier is set equal to a mathematical product of the feedback multiplier, feed forward multiplier, and global speed factor during the pure evacuation step and the evacuation with product purge step, that will increase the speed such that centrifugal compressor is not likely to enter surge conditions. Global speed factors are determined from the previous highest adsorption pressure at the end of feed and the lowest desorption pressure end of the purge steps for each vessel in the apparatus, wherein the global speed factor will increase the speed over all steps for each compressor when the obtained highest adsorption pressure is too low and the obtained lowest desorption pressure is too high. An adjusted speed is calculated by multiplying the optimal speed by the total speed multiplier, which includes the effect of the global speed factor.

The controller is configured to generate a control signal in response to the control program and able to serve as an input into the variable frequency drive such that speed of the electric motor and therefore, the centrifugal compressor is controlled in response to the control signal. The control signal is referable at least to the adjusted speed such that the electric motor and therefore, the centrifugal compressor operates at the adjusted speed.

As indicated above, the system is applicable to a vacuum pressure swing adsorption apparatus that utilizes a feed compressor for feeding compressed gas to adsorption beds of the vacuum pressure swing adsorption apparatus and an evacuation compressor used in evacuating gases from the adsorption beds. In such case, the evacuation compressor is formed by the centrifugal compressor. Another centrifugal compressor may or may not be used in forming the feed compressor.

Feed to the vacuum pressure swing adsorption apparatus can be supplied from separate compressors or from a single compressor. More specifically, the two beds can have a compressor dedicated for feed and another compressor dedicated for evacuation, or each bed can have a compressor dedicated for both feed and evacuation. In such cases where more than one compressor is used to drive the apparatus, the repeating cycle can include a feed with equalization step subsequent to the evacuation with product purge step, a feed with product repressurization step following the feed with equalization step and an equalization step prior to the pure evacuation step. The control program can be programmed to produce a non-operational speed at which the variable frequency drive will remove electrical power from the electric motor and the control signal is referable to the non-operational speed when produced by the control program. During the feed with equalization step, the equalization step and initiation of the feed with product repressurizaton step, the control program produces the non-operational speed such that when the control signal is inputted into the variable frequency drive, electrical power is not applied to the electric motor. The control program also programmed such that when a predetermined value of the pressure ratio is obtained during the feed with product repressurization step, the control signal is again referable to the adjusted speed such that the electric motor and therefore, the compressor operates at the adjusted speed. In case of a vacuum pressure swing adsorption apparatus that uses a dedicated evacuation compressor, the repeating cycle can include a falling pressure equalization step and a rising pressure equalization step subsequent to the evacuation with product purge step. The control program in such case is programmed to produce a non-operational speed at which the variable frequency drive will remove electrical power from the electric motor and the control signal is referable to the non-operational speed when produced by the control program. During the falling pressure equalization step and the rising pressure equalization step, the control program produces the non-operational speed such that when the control signal is inputted into the variable frequency drive, electrical power is not applied to the electric motor driving the evacuation compressor. The control program is also programmed such that when a predetermined value of the pressure ratio is obtained during the falling pressure equalization step, the control signal is again referable to the adjusted speed such that the electric motor and therefore, the evacuation compressor operates at the adjusted speed.

The control program can be programmed such that each time the feedback multiplier is determined, the feedback multiplier is stored. In accordance with such programming, when the parameter is less than the minimum allowable value, the feedback multiplier is determined by adding to a last stored value of the feedback multiplier a speed correction factor. When the parameter is greater than or equal to the minimum allowable value, the feedback speed multiplier is determined by dividing the last stored value of the feedback multiplier by a proportionality constant. The proportionality constant is set equal to a value greater than 1.0 when the last stored value of the feedback multiplier is greater than or equal to 1.0 or 1.0 when the last stored value of the feedback multiplier is less than 1.0.

The control program can also be programmed such that the feed forward multiplier is a function of the pressure ratio. Such function has a maximum value of the feed forward multiplier at a predetermined pressure ratio at which or directly before which the centrifugal compressor will likely enter surge conditions during a transition between the evacuation step and the purge step. The feed forward multiplier has decreasing values of the feed forward multiplier at pressure ratios greater than or less than maximum value. The maximum valve has a magnitude preselected such that when the maximum valve is multiplied by the optimal speed at the predetermined pressure ratio the resulting speed will prevent the centrifugal compressor from entering surge conditions. The function can be a Gaussian function.

The control program additionally can be programmed such that each time the global speed factor (GSF) is calculated, the GSF is stored. Each time the vessel pressure measurement from the process differs from the target value, the GSF is determined by adding a GSF correction factor to the last stored value of the GSF. The GSF correction factor is determined by the sum of two terms, the first obtained by multiplying the difference between the target value and the current value for the current cycle and previous cycle by a proportionality constant, and adding to this first term a second term obtained by dividing the difference between the target value and the current value for the current cycle by a second proportionality constant.

$$GSF,new = GSF,current + K1(Error,current - Error,previous) + K2(Error,current)$$

The GSF is nominally 1 if the conditions of the cyclic adsorption process permit running the compressor wheel along the optimal efficiency line during the entire process, while achieving the target highest adsorption and lowest desorption pressures for the process accordingly.

The parameter sensing means can include two further pressure transducers situated at two points in the shroud of the centrifugal compressor that are successively closer to an impeller thereof. In such case, the control program is programmed to calculate a pressure difference from pressure measured by the two further pressure transducers. The parameter is the pressure difference. In such case, the control program can be programmed such that during each of the time intervals, a pressure difference error is calculated and stored by subtracting the minimum allowable value from the current value of the pressure difference. The speed correction factor of the feedback multiplier is calculated during each of the time intervals through proportional integral control comprising adding a proportional term to an integral term. The proportional term calculated by multiplying a gain factor by a difference between the pressure difference error and a prior pressure difference error calculated in a prior time interval and dividing the difference by the time interval. The integral term can be calculated by dividing the gain factor by an integral reset time and multiplying a resultant quotient thereof by the pressure difference error.

BRIEF DESCRIPTION OF THE DRAWINGS

While the specification concludes with claims distinctly and particularly pointing out the subject matter that Applicants regard as their invention, it is believed that the invention will be better understood when taken in connection with the accompanying drawings in which:

DETAILED DESCRIPTION

Figure 1:
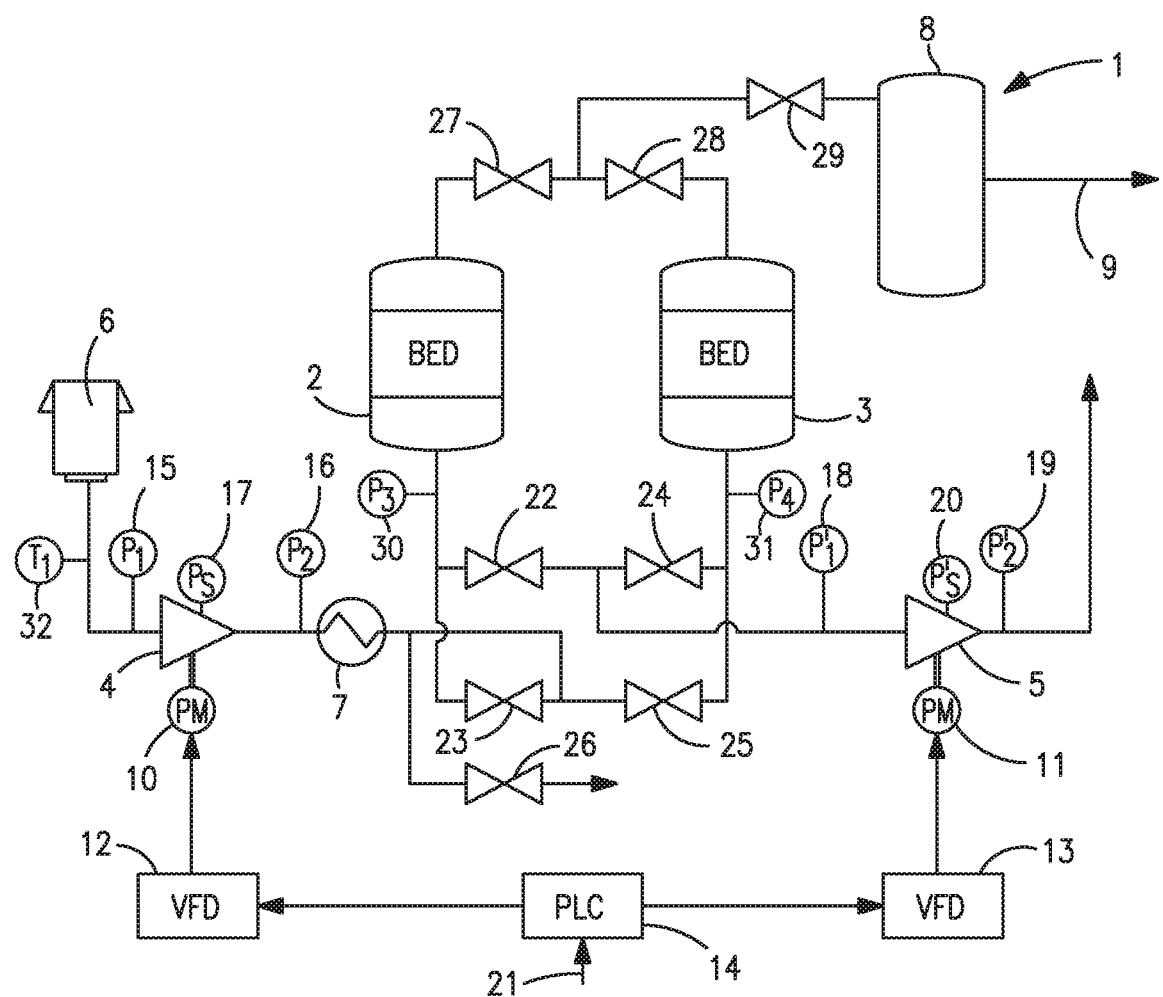
FIG. 1 is a schematic diagram of a vacuum pressure swing adsorption apparatus utilizing dedicated feed and evacuation compressors in connection with adsorbent beds for carrying out a process in accordance with the present invention.

With reference to FIG. 1, a vacuum pressure swing adsorption apparatus 1 is illustrated that is designed to produce an oxygen product. Although vacuum pressure swing adsorption apparatus 1 is a two-bed design, it is understood that this is for purposes of illustration and the present invention would have equal applicability to a single or multiple bed design using a single or multiple compressors designed to pressurize and evacuate an adsorbent bed or beds. Furthermore, the present invention is equally applicable to vacuum pressure swing adsorption apparatus designed to produce other products such as carbon dioxide, nitrogen, hydrogen or helium. As such, the vacuum pressure swing adsorption apparatus 1 is shown and described herein for exemplary purposes only.

With reference to FIG. 1, an apparatus 1 is illustrated for conducting a vacuum pressure swing adsorption cycle in which two adsorbent beds 2 and 3 are subjected to a twelve step vacuum pressure swing adsorption cycle in which a feed compressor 4 alternately feeds compressed air to the two adsorbent beds 2 and 3 and an evacuation compressor 5 alternately evacuates the adsorbent beds 2 and 3 of gases during such cycle. The feed air is drawn in through an inlet 6 that contains a filter to filter out particulates. The resulting air stream is drawn by compressor 4 having an after cooler 7 to remove the heat of compression. The resulting compressed feed stream is introduced into either adsorbent bed containing well-known LiX adsorbents to produce an oxygen product that is introduced into an oxygen surge tank 8 from which a product oxygen stream 9 can be drawn. Evacuation compressor 5 draws a waste stream from the adsorption bed and discharges to ambient. The feed and evacuation compressors 4 and 5 are driven by variable speed motors 10 and 11, respectively, that are controlled by variable speed drives 12 and 13. The variable speed motors 10 and 11 could be permanent magnet or induction motors. The variable speed drives 12 and 13 control the speed of the motors and are responsive to adjusted speed signals generated by a controller 14. Controller 14 generates the adjusted speed signals and is in turn responsive to signals generated by pressure transducers P1, P2 and PS, designated by reference numbers 15 16 and 17 in connection with the feed compressor 4 and pressure transducers P'1, P'2, and P'S, designated by reference numbers 18, 19 and 20 in connection with evacuation compressor 5. The electrical connections between the foregoing pressure transducers and the controller 14 has not been shown for purposes of simplifying the explanation of the vacuum pressure swing adsorption cycle employed in connection with apparatus 1. In this regard, controller 14 is also responsive to a signal 21 which indicates to controller 14 the step of the vacuum pressure swing adsorption cycle.

The programming of the controller 14, as will be discussed, is with regard to the embodiment of the invention shown in FIG. 1 in which feed and evacuation duties of feed and evacuation compressors 4 and 5 respectively are dedicated. The vacuum pressure swing adsorption cycle employed in apparatus 1 is one that is disclosed in U.S. Pat. No. 6,010,555 and encompasses operations in which adsorption bed 2 is on-line and producing product and adsorption bed 3 is off-line and is being regenerated. Afterwards in the cycle, adsorption bed 2 is brought off-line and regenerated while adsorption bed 3 is on-line and producing product. It is to be further noted, that unless indicated otherwise, the valves shown in FIG. 1 are set in normally closed positions.

The following is a Table indicating the valve positions during each of the steps in the cycle where "O" indicates an open valve, "C", a closed valve and "P", a partially open valve.

TABLE XX

| | Steps | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Step Description: | | | | | | | | | | | | |
| Bed 101 | FD, EU | FD, PP | FD | FD, AD | FD, AD, PPG | ED | ED, EV | EV | EV | EV | EV, PG | EV, EU |
| Bed 102 | ED, EV | EV | EV | EV | EV, PG | EV, EU | FD, EU | FD, PP | FD | FD, AD | FD, AD, PPG | ED |
| Valve No.: | | | | | | | | | | | | |
| 22 | C | C | C | C | C | C | O | O | O | O | O | O |
| 23 | O | O | O | O | O | C | C | C | C | C | C | C |
| 24 | O | O | O | O | O | O | C | C | C | C | C | C |
| 25 | C | C | C | C | C | C | O | O | O | O | O | C |
| 26 | C | C | C | C | C | O | C | C | C | C | C | O |
| 27 | O | O | C | O | O | P | P | C | C | C | P | O |
| 28 | P | C | C | C | P | O | O | O | C | O | O | P |
| 29 | C | P | C | O | O | C | C | P | C | O | O | C |

Figure 2:
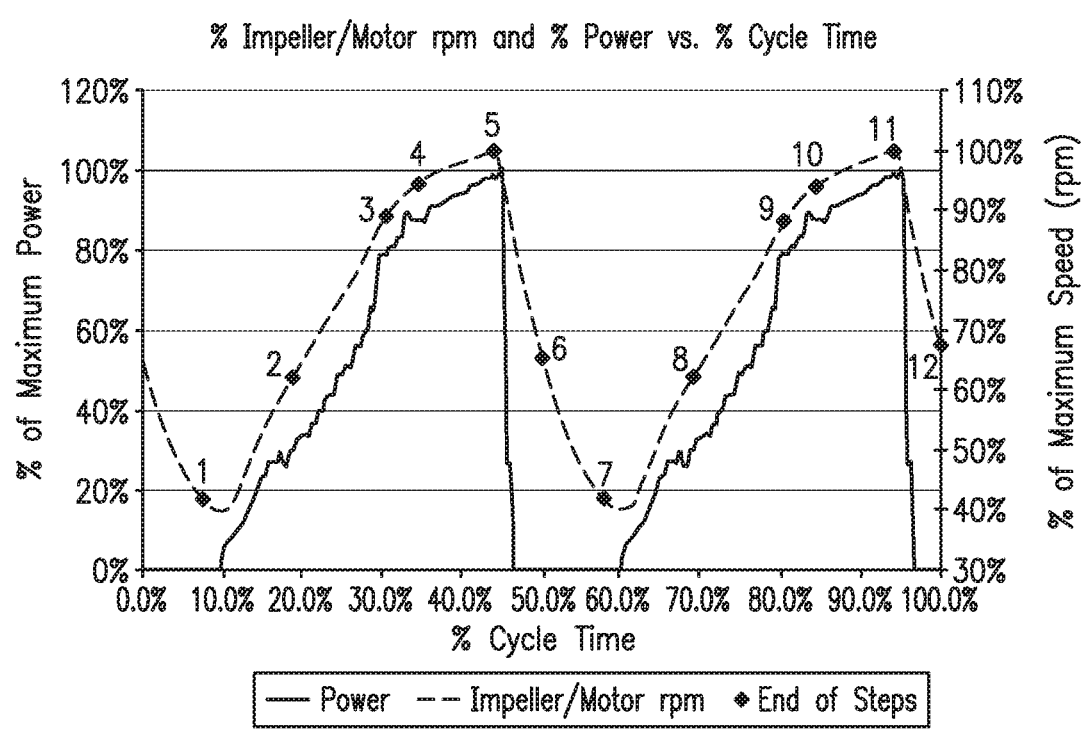
FIG. 2 is an exemplary diagram of the speed and power applied to a motor used in driving the feed compressor used in FIG. 1.

Referring first to FIG. 2 containing the feed steps involving repressurization of adsorbent bed 2, adsorbent bed 3, in a first step, is subjected to a feed with equalization step ("FD,EU") in which filtered air is drawn through inlet 6 and compressed by feed compressor 4 to pressurize the adsorption bed 2 from the bottom with feed air. Simultaneously, equalization gas is delivered from depressurizing adsorption bed 3. For such purposes, valves 23 and 27 are set in open positions and valve 28 is set in a partially open position. In step 2, a feed with product pressurization step ("FD,PP"), valve 28 is closed and valve 29 is set in a partial open position to allow high purity product to be supplied from oxygen surge tank 8. In a subsequent step 3, adsorbent bed 2 continues to be repressurized from the bottom with compressed feed air a raising pressure feed step ("FD"). At this point, valve 23 remains open. Turning to FIG. 2, it can be seen that in step 1, the speed of the feed compressor 4 is falling due to deceleration from a final step. In step 2, the speed first decreases and then increases as the pressure of the adsorbent bed 2 is brought up to operational pressure and in step 3, the speed is increasing as the adsorbent bed 2 is further pressurized. During steps 4 and 5, product is being made and is being delivered to oxygen surge tank 8. In step 4, a constant pressure feed with product make step ("FD, AD") valves 23, 27 and 29 are all set in open positions. At step 5, a combined product make and purge step ("FD,AD, PPG"), valve 28 is additionally set in an open position to allow adsorbent vessel 3 to be purged from the top with product. In step 6, an equalization step ("ED"), power to the feed compressor 4 is removed and as shown in FIG. 2, the compressor 4 therefore decelerates. At this point, valves 23 and 29 are set in closed position and valve 28 is set in an open position to allow accumulated product gas to flow to adsorbent bed 3.

Figure 3:
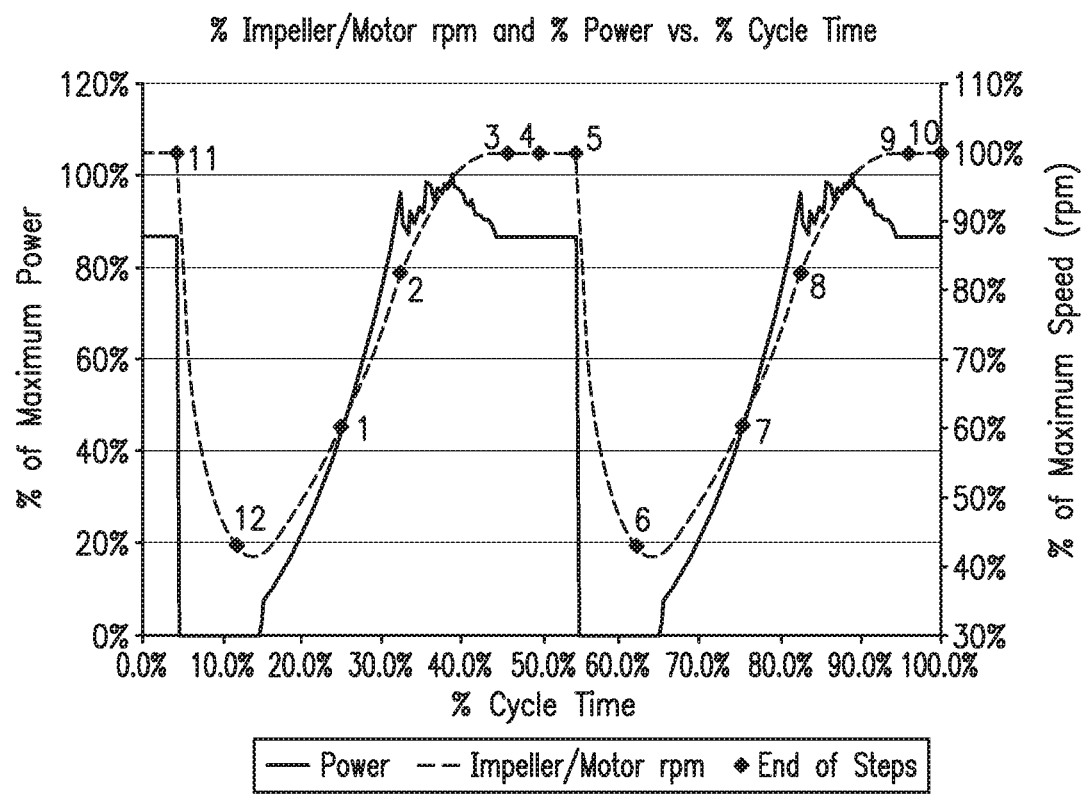
FIG. 3 is an exemplary diagram of the speed and power applied to a motor used in driving the vacuum compressor used in FIG. 1.

With reference to FIG. 3, the adsorbent bed 2 is then regenerated with a falling pressure evacuation and equalization step ("ED,EV") in step 7. During this step, a valve 22 is set in an open position to allow waste nitrogen to be removed from adsorbent bed 2 by action of evacuation compressor 5. Additionally, valve 27 is set in a partially opened position and valve 28 is set in the fully open position for such purposes. A valve 25 is set in an open position to allow adsorbent bed 3 to be fed with compressed air from feed compressor 4. During pure evacuation steps 8, 9 and 10, valve 27 is re-set into the closed position and waste nitrogen continues to be withdrawn from the bottom of adsorbent bed 2 by means of evacuation compressor 5. These are all pure evacuation steps ("EV") where pressure within the adsorbent bed falls. In subsequent step 11, a constant pressure evacuation with product purge step ("EV,PG") adsorbent bed 2 continues to be evacuated by evacuation compressor 5 while being fed from the top with an oxygen purge gas by means of setting valve 27 in a partially opened position. Thereafter, step 12 is conducted which is a raising pressure equalization step ("EV,EU"). During this final step, adsorbent bed 2 continues to be evacuated by evacuation compressor 5 while valve 27 is now set in a fully open position. Valve 26 is set in an open position to allow upstream pressure produced by the feed compressor 4 to vent. Pressure rises because the flow of equalization gas is greater than and at a higher pressure than the gas being drawn by evacuation compressor 5. With additional reference to FIG. 3, it can be seen during steps 7 through 10, the speed of evacuation compressor 5 increases. During step 11, the speed is constant and during step 12, the speed falls as the evacuation compressor 5 is then unpowered. Thereafter, adsorbent bed 2 is subjected to step 1 and the cycle repeats. As mentioned previously, adsorbent bed 3 is subjected to the same feed and evacuation steps with the use of the feed compressor 4 and the evacuation compressor 5. During the evacuation steps 7-12, adsorbent bed 3 is subjected to the feed compression steps mentioned above for adsorbent bed 2. During such steps, the valve positions are as indicated in the Table above.

Although not illustrated, the valves would be controlled by a programmable logic controller that would be programmed to proceed from step to step on the basis of pressure and time. Due to the conventional design constraint of cyclic symmetry in adsorption processes, time steps used to evacuation and pressurization of the adsorption beds are typically fixed in duration and equivalent for each half-cycle in the process. Therefore, steps 1 and 7 are of equivalent length, as well as step 2 and 8, and so on and so forth. The duration of the steps during which pressure varies in the cycle are usually constant from one cycle to the next, which facilitates the formation of a stable and repeating pressure trace and thus optimal operation. However, the duration of the steps in which the pressure does not significantly vary, such as steps 4 and 5 during adsorption and 10 and 11 during evacuation, may vary in duration from one cycle to the next.

Primarily, the degree of production can be manipulated for each bed by adjusting the duration of these steps, and thus the purity can be controlled in this manner. If such a step is ended premature to its designed duration, the cyclic adsorption process simply moves to the next step in the cycle. Additionally, and most importantly for the concept of the present invention, these steps can be ended if the adsorption process achieves a pressure in a bed which is outside the desired range of operation. This range of operation is between the highest adsorption pressure and the lowest desorption pressure. Referring again to FIG. 1, these highest adsorption pressure and lowest desorption pressure are measured using pressure transducers P3 and P4, designated by reference numbers 30 and 31, respectively. During steps 1 through 6 in the cycle, adsorption bed 2 is rising in pressure until it reaches its highest adsorption pressure, as measured by pressure transducer 30. Simultaneously, during steps 7 through 12 in the cycle, adsorption bed 3 is falling in pressure until it reaches its lowest desorption pressure, as measured by pressure transducer 31. Adsorption beds 2 and 3 then exchange operation modes in the cycle and the task of measuring highest adsorption pressure is accomplished by transducer 31, with the task of measuring lowest desorption pressure simultaneously accomplished by transducer 30. Ending steps 4, 5, 10, or 11 prior to their designed duration can be used to prevent the process from reaching a pressure ratio from the associated centrifugal compressors which cannot be achieved without a surge event.

Controller 14 can be a Allen Bradley SLC 5/05 processer programmed with RSLogix 500 software or equivalent that can be obtained from Rockwell Automation located in Milwaukee, Wis., USA. The program within controller 4 continually executes during predetermined, repeating time intervals. Controller 14 is responsive to signals generated by pressure transducers 15, 16, 17, 18, 19, and 20 and preferably a temperature transducer 32 and transmitted by suitable electrical connections omitted from the diagram with the intent of simplifying the explanation of the apparatus 1 used in conjunction with the vacuum pressure swing process. Additionally, a data input 21 is provided that serves as an input to the controller 14 containing the actual current step that the repeating cycle being conducted by the vacuum pressure swing adsorption apparatus 1. This data concerning the current step serves as in input to the control program that in a manner to be discussed responds to such data. Data input 21 can be obtained from the controller acting to control the valves in the repeating cycle being conducted by vacuum pressure swing adsorption apparatus 1.

Although the present invention has been thus far described with reference to a two-bed vacuum pressure swing adsorption process, it is equally applicable to a single bed process. As would be known to those skilled in the art, where a single bed process was conducted, in place where equalization gas would be vented from one adsorbent bed and introduced into another adsorbent bed, a recovery tank can be utilized. Since the production would be discontinuous, the oxygen surge tank 18 would be of larger volume than that used with the illustrated two-bed apparatus and process.

Figure 4:
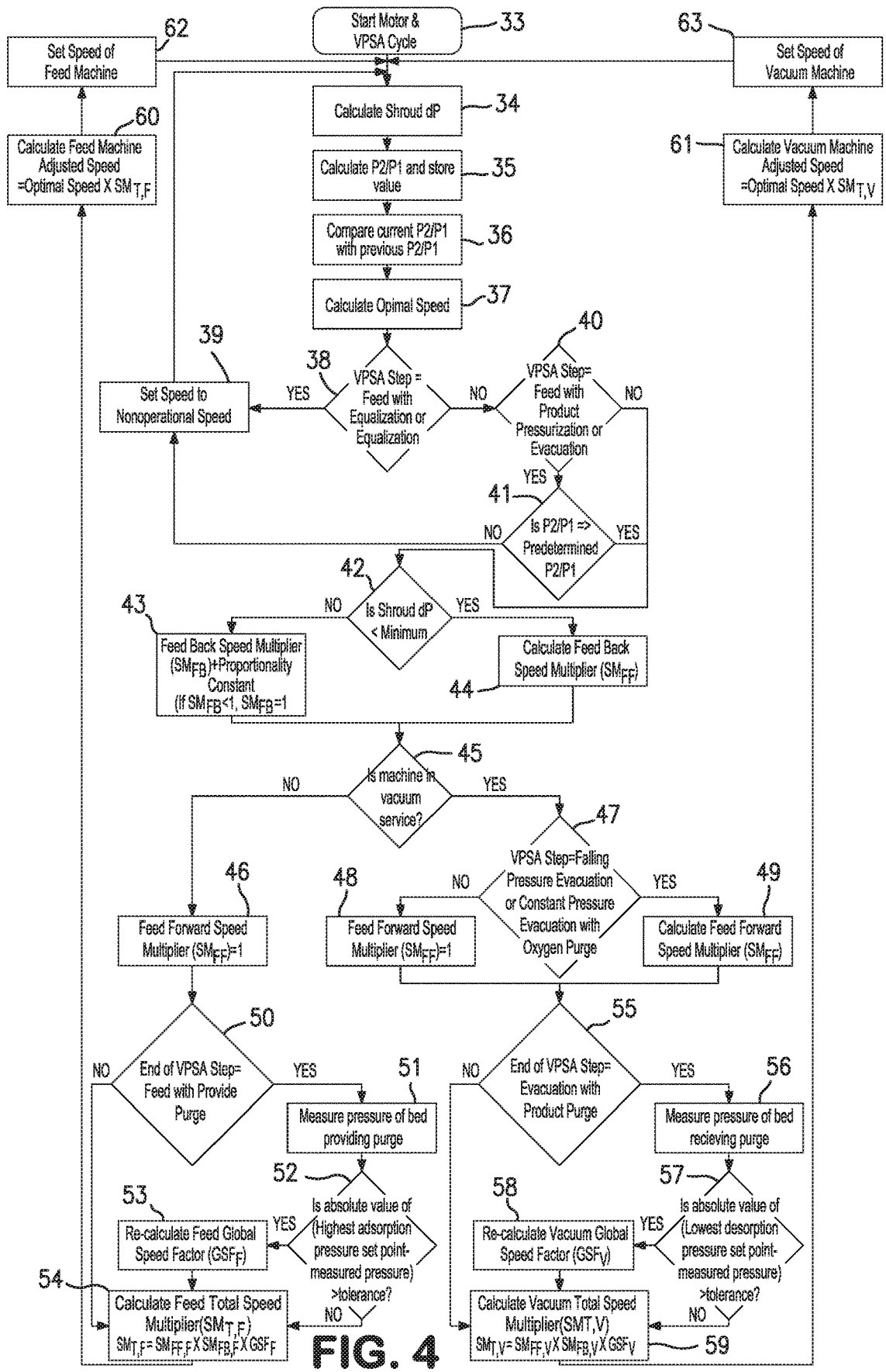
FIG. 4 is a logic diagram of speed control programming utilized in a controller employed in FIG. 1.

With reference to FIG. 4 the control logic is programmed within controller 14 by means of a control program. As a first stage of the programming, as illustrated by logic block 33, the motors 10 and 11 are started along with a repeating cycle conducted by the vacuum pressure swing adsorption apparatus 1 that has been described above with respect to the positioning of the valves. In starting the motors 10 and 11, they are set to run at a minimum speed which constitutes 40 percent of a design maximum speed. At above this speed, additional power begins to be applied to the motor. The variable frequency drives 12 and 13 are responsive to the control signals generated by controller 14 to either control the permanent magnet motors 10 and 11 to run at an adjusted speed that will avoid surge or to cut power to the high speed permanent magnet motors 10 and 11 and thereby allow the permanent magnet motors 10 and 11 and therefore, the compressors 4 and 5 to decelerate when required in the repeating cycle.

After the first step 33, the controller then commences the continual execution over the predetermined, repeating time intervals which are each preferably less than 1 millisecond. In the step 34 a pressure difference "dP" is calculated at the shroud of compressors 4 and 5 at two points or locations that are situated successively closer to the impeller or at the points measured by pressure transducers 16 and 17, respectively and 19 and 20, respectively. This pressure difference, between the pressure measured by pressure transducers 16 and 17, respectively and 19 and 20, respectively, provide a parameter that is referable to the flow passing through the compressor 4 or 5, respectively. In this regard, flow could be directly measured by a flow transducer. In the next logical stage of execution, designated by reference number 35, a pressure ratio across the compressor is calculated on the basis of the pressures measured by pressure transducers 16 and 15, respectively or 19 and 18, respectively or in other words, a ratio between outlet and inlet pressure for both compressors 4 and 5 and stored. Following the pressure ratio computation and storage, the current pressure ratio is compared with a previous value in step 36.

Figure 5:
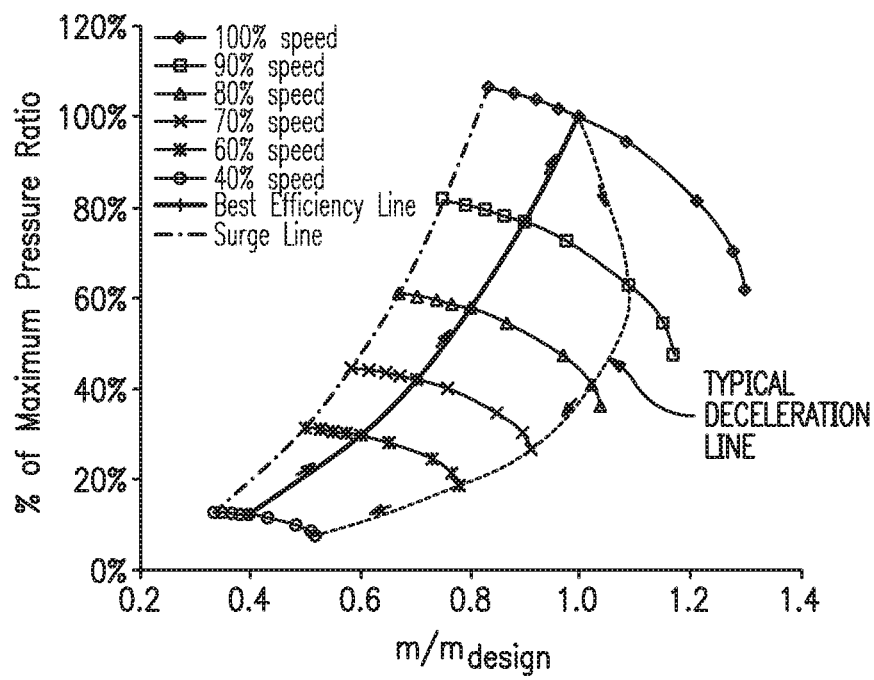
FIG. 5 is an exemplary curve of a compressor map illustrating the peak efficiency operating line graphed against pressure ratio versus mass flow through the compressor.

The optimal speeds of the compressors 4 and 5 are determined in logic block 37 from the pressure ratio calculated in logic block 34 that lies along the peak efficiency operating line. This is determined from compressor performance data for the particular compressor used. With reference to FIG. 5, an example of such data is set forth. The exact determination of this speed could be from a look up table or a polynomial equation in which the points of the peak efficiency operating line, referred to in the Figure as the "Best Efficiency Line", are fit in accordance with well-known curve fitting techniques. It is understood that this curve will vary slightly based upon the temperature measured by temperature transducer 32. As such there would be data programmed within the control program that constitutes a family of such curves. Where temperature lies in an intermediate point, the exact speed could be interpolated between curves or multiplied by a correction factor equal to a ratio of the measured temperature to the design temperature from which an operating curve was derived. Alternatively, there could be a single curve that is based upon the expected temperature in which apparatus 1 operates. In such case, there would be no requirement for an input of temperature from temperature transducer 32. The lines crossing the peak efficiency operating line are specific speeds at which pressure ratio will vary with flow rate through the compressor. As is evident from the graph, at any particular speed, there exists a flow rate through the compressors 4 and 5 at which surge will occur.

After the optimal speed is calculated in execution step 37, logical step 38 is performed in which it is determined whether the vacuum pressure swing adsorption cycle is at the start of step 1 or step 5, namely, at the start of the feed with equalization or the equalization steps. This determination is made from data input 21. If at the start of such steps, then a non-operational speed is set by the programming, as indicated in step 39, and the control signal sent from controller 14 to VFD 12 and 13 will be referable to such non-operational speed. For instance, this speed could be 40 percent of the design maximum speed of the motor 10 and 11. The variable frequency drives 12 and 13 are in turn programmed or set up so that when the control signal is referable to the non-operational speed, energy input to the motors 10 and 11 will be disabled, allowing the drive train (motor rotor and compressor impeller) to free-wheel decelerate or coast down to its minimum speed without consuming any power. In this regard, variable frequency drives 12 and 13 are typically set up to so function without any modification. This being said, it is equally possible to program the control program executing within controller 14 to generate a signal to control the power supply to the permanent magnet motors 10 and 11 to cut power when appropriate in the repeating cycle. With reference again to FIG. 5, the "Typical Deceleration Line" is the path the compressor follows when the repeating cycle conducted by the vacuum pressure swing adsorption apparatus 1 requires the compressor speed to decelerate due to falling head requirements. With reference again to FIG. 2, this is the case in steps 5, 6, 11, and 12 for a compressor in feed compression service, and this is also the case in steps 5 and 11 for a compressor in evacuation service.

Eventually, the drive train will have to power up the compressor 4 in feed compression service during steps 2 and 8 or in other words, the feed with product pressurization step for each bed, respectively. Also eventually, the drive train will have to power up the compressor 5 in evacuation service during steps 1 and 7. With regards to compressor 4 in feed service, it begins with falling pressure during step 1 and the beginning of step 2. Consequently, at the initiation of step 2, the control signal sent from controller 14 to VFD 12 remains referable to the non-operational speed. However, with reference again to FIG. 2, pressure over a portion of such step begins to rise due to requirements of the repeating cycle and the application of power to the permanent magnet motor 10. In order to execute appropriate control to effectuate the foregoing operation, if the logic in step 38 is answered in the negative, then the program proceeds with execution of the test indicated in logic block 40 in which it is determined whether the step of the repeating cycle, the "VPSA Step" is at the feed with product pressurization, namely step 2, discussed above. Again this test is performed on the basis of the data input 21. If this test is answered in the affirmative, execution of the control program proceeds to execution of a further test shown in logic block 41 and the current pressure ratio "P2/P1", as measured by pressure transducers 16 and 15, is compared with a predetermined pressure ratio of "Predetermined P2/P1" which has previously being programmed within the control program. If the current pressure ratio is less than the predetermined pressure ratio, then again the program proceeds to the execution stage of the programming shown in block 39 and the permanent magnet motor 10 is allowed to continue to decelerate. As illustrated, where power to motor 10 is cut, the control program loops back to execution stage 34. If, however, the tests performed in the programming as set forth in logic blocks 38 and 40 are in the negative or the test performed in logic block 41 is in the affirmative, then the repeating cycle is possibly in step 2 or step 7 where power must be applied to the permanent magnet motor 10. At such point in the repeating cycle being conducted by vacuum pressure swing adsorption cycle, the compressor is being powered and therefore, there is a possibility or likelihood that surge conditions could be encountered in the operation of compressor 10. In order to avoid operation of compressor 10 where surge conditions could be encountered, the programming logic proceeds to the remainder of its execution starting with logic block 42. With regards to the compressor 5 in evacuation service, the same progression of decisions through logical blocks 38, 40, and 41 is also undertaken to determine when to cease the execution in block 39 which maintains the compressor 5 at the minimum acceptable operational speed for motor 11. Thus the evacuation compressor 5 also proceeds to logical block 42 when power is being applied to the motor 11 and the pressure across the compressor 5 begins to rise, as measured by the ratio of transducer signals 19 to 18.

In the execution of the programming as shown by logic block 42, the calculated pressure difference in logic block 34 "Shroud dP" for each compressor is compared with a minimum dP. This minimum dP which is a value that is experimentally determined to be the minimum value over the entire cycle at which the compressor 4 or 5 will surge with a factor of safety. For instance, if compressor 4 or 5 will surge at any time during the repeating cycle conducted by the vacuum pressure swing adsorption apparatus 1 at a dP equal to 2 inches of water, the 2 inches of water is multiplied by 15 percent to obtain the minimum. An alternative to this is to determine at dP in step 37 along with the calculation of the optimal speed from the compressor map of the compressor as shown as an exemplar in FIG. 5 to be discussed.

The execution of logic block 68 is a critical step because if the flow rate through either compressor is less than a minimum, then there exists a danger that the compressors 4 or 5 will enter surge. If, however, the calculated current pressure difference dP obtained in logic block 34 is greater than or equal to the minimum, there exists a lower probability of the compressor entering surge. In cases, however, that the calculated pressure difference from logic block 34 is not less than such minimum, as indicated in execution step 43 a feedback speed multiplier is calculated by dividing the last stored value of the feedback multiplier, "(SM$_{FB}$")" that has been determined in a previous execution of the control program, by a proportionality constant. The proportionality constant is set equal to a value greater than 1.0, for instance 1.04 when the last stored value of the feedback multiplier is greater than or equal to 1.0. The exact value of such proportionality constant is determined through experimentation and can be considered as a tuning factor. When, however, the last stored value of the feedback multiplier is less than 1.0, the proportionality constant is simply set to 1.0. When such a feedback multiplier is multiplied by the optimal speed calculated in the execution stage illustrated by block 37, the effect of this will be to decrease speed slightly by use of the proportionality constant or to further decrease the speed by the factor of the last stored feedback multiplier when such last stored feedback multiplier is less than 1.0. If, however, the pressure difference measured in step 34 is less than the minimum pressure difference, then, as indicated in execution block 44, a new feedback multiplier will be calculated that will have the effect of increasing the speed. The calculation contemplated in block 44 is to add to a last stored value of the feedback multiplier, a speed correction factor. While such speed correction factor could be a constant, preferably, the speed correction factor contains proportional and integral terms. During each execution of the program, a pressure difference error is calculated and stored by subtracting the minimum allowable value from the current value of the pressure difference calculated in block 34. The proportional term is calculated by multiplying a gain factor by a difference between the pressure difference error and a prior pressure difference error calculated in a prior time interval or a prior execution of the control program and dividing the difference by the time interval. This prior pressure difference error is obtained from the stored value read from block 34 before calculation and storage of the current pressure difference error. The integral term is calculated by dividing the gain factor by an integral reset time and multiplying a resultant quotient thereof by the current pressure difference error.

The foregoing can be illustrated by the following equation:

$$SM_{FBi} = SM_{FBi-1} + K_c * \frac{(\varepsilon_i - \varepsilon_{i-1})}{t} + \frac{K_c}{\tau_I} * \varepsilon_i;$$

where: SMFB$_i$=Feed Back Speed Multiplier; SMFB$_{i-1}$=The previous stored value of the Feed Back Speed Multiplier, K$_c$ is the gain; $\varepsilon_i$ is the pressure difference error; $\varepsilon_{i-1}$ is the last stored value of the pressure difference error; $\tau_I$ is the integral reset time and t is the execution time interval of the control program. Thus, proportional-integral speed control is being exercised here and the "gain" and the "integral reset time" are simply known tuning factors that will be experimentally determined in a manner known in the art.

The program execution next proceeds to a logic block 45 in which the program tests whether or not the compressor is in service as an evacuation compressor. Due to the different operational speed requirements of compressors 4 and 5 in feed compression and evacuation service, respectively, the program executes two separate series of logic and execution steps for each type of compressor following logic block 45. However, the control program following block 45 for each compressor 4 or 5 contains similar elements and thus explanation of the steps of the respective programs in parallel is illustrative.

If the answer to block 45 is in the negative, the compressor is in service as a feed air compressor. The program proceeds to execute block 46 and sets the value of a feed forward speed multiplier equal to 1.0, as it is the experience of the inventors that the feed forward speed multiplier is not necessary for operation of the compressor in feed air compression service. It is recognized by the inventors, however, that such a feed forward speed multiplier could be used to adjust the speed of the compressor of vacuum pressure swing apparatus 1 purposed for feed air compression service if desired. If the answer to logic block 45 is in the affirmative, the program then proceeds to a subsequent logic block 47 where the current step of the repeating cycle conducted by the vacuum pressure swing adsorption apparatus 1 mentioned above is either in an evacuation or evacuation with purge step, or in other words, whether it is in steps 1, 2, 7, or 8 involving evacuation or evacuation with a product purge. If the vacuum pressure swing adsorption process is not in either of these steps, the feed forward speed multiplier is set at 1.0 as indicated in the execution block of program designated by reference number 48

In case the test perform in logic block 47 is in the affirmative, then a feed forward speed multiplier is calculated in step 49 that will prevent surge during the evacuation or evacuation with purge steps and in particular at a point during the vacuum pressure swing adsorption cycle that lies near or at a transition between these two steps. While not well understood by the inventors herein, it has been found in practice that there exists a particular danger of the compressor 5 in evacuation service entering surge at that point of operation. In any case, with reference to FIG. 6, depending upon the current pressure ratio value calculated in step 35, a feed forward multiplier will be determined that is dependent upon such pressure ratio that will prevent surge. When this feed forward multiplier is multiplied by the feedback speed multiplier, the effect will be to increase the total speed multiplier over that which would be obtained from the feedback speed multiplier alone.

For a compressor in service as a feed air compressor, the program execution next proceeds to a logic block 50 in which the program tests whether the current step of the repeating cycle conducted by the vacuum pressure swing adsorption apparatus 1 mentioned above has reached the end of the feed with provide purge step. If the end of the feed with provide purge step 5 has just occurred, then a measurement of the pressure in the bed providing the product purge gas is made in execution block 51 via the pressure transducer 30 on adsorption bed 2 of vacuum pressure swing adsorption apparatus 1. Similarly, if the end of step 11 has just occurred, the measurement is made from transducer 31 on adsorption bed 3. This pressure measurement is then compared in logic block 52 to the target highest adsorption pressure set point for the vacuum pressure swing process. If the absolute value of the pressure difference calculated in step 52 is greater than the specified tolerance, which is typically 2 inches of water, then the program proceeds to execution block 53 where a new feed global speed factor ($GSF_F$) will be calculated. Specified tolerance is the deadband employed in the control scheme that determines whether or not the GSF should be changed. Specified tolerance can vary anywhere in a range of from about +/−14 inches of water to about +/−1 inch of water; in another embodiment from about 10+/− inches to about 2+/− inches of water. Typically, the specified tolerance is +/−2 inches of water. The feed global speed factor will have the effect of generally increasing or decreasing the speed of the compressor across all steps of the cyclic process with the goal of reducing the absolute difference between the measured pressure of block 52 and the target highest adsorption pressure set point for the vacuum pressure swing process. If the difference between the measured pressure and the set point is less than some tolerance, then the global speed factor (GSF) for the compressor in feed air compression service is left unmodified from the previous cycle. Since this recalculation can only occur at the end of the feed with provide purge steps, if the vacuum pressure swing process has not just reached the end of said steps, the program proceeds to execution block 54 where the feed total speed multiplier is calculated, to be discussed further herein.

Similar to the compressor in service as a feed air compressor, the control of compressor 5 in service as an evacuation compressor also proceeds through a series of logical and execution steps in the program to generally increase or decrease the speed of permanent magnet motor 11 based on the pressure measurements from transducers 30 and 31 of the vacuum pressure swing process apparatus. If the end of the evacuation with product purge step has just occurred, logical block 55 is in the affirmative. If the evacuation with product purge step that just terminated was vacuum pressure adsorption process step 5, block 56 is then executed and a pressure measurement of bed 3 via pressure transducer 31 is made. Similarly, if step 11 just terminated, a pressure measurement of bed 2 using pressure transducer 30 is executed. The pressure measurement is then compared to a target lowest desorption pressure set point in logic block 57. If the absolute value of the difference between the measured pressure from block 56 and the set point is greater than the specified tolerance, again typically 2 inches of water, progress through block 57 is in the affirmative and the value for a vacuum global speed factor ($GSF_v$) is recalculated in execution block 58. Similar to the feed global speed factor, the vacuum global speed factor will have the effect of generally increasing or reducing the speed of the compressor in evacuation service over all steps of the vacuum pressure swing process. If the absolute difference between the measured pressure from block 56 and the set point is less than the specified tolerance, the vacuum global speed factor is left unmodified from the previous cycle. Since the recalculation of the vacuum global speed factor only occurs at the end of the evacuation with product purge steps, if the vacuum pressure swing process has not just reached the end of said steps, the program proceeds to execution block 59 where the vacuum total speed multiplier is calculated.

The recalculation of the respective global speed factors contemplated in block 53 and 58 is to add to a last stored value of the global speed factor, a global speed factor correction. While such GSF correction could be a constant, preferably, the GSF correction parameter contains proportional and integral terms. The absolute value of the pressure difference analyzed in blocks 52 and 57 for each feed air and evacuation compressors is denoted as the current pressure difference error for each compressor. A proportional term is calculated by multiplying a gain factor by a difference between the current pressure difference error and a prior pressure difference error calculated in a prior time interval or a prior execution of the control program and dividing the difference by the time interval. This prior pressure difference error is obtained from the stored value read from logic block 52 or 57 before calculation and storage of the current pressure difference error. An integral term also is calculated by dividing the gain factor by an integral reset time and multiplying a resultant quotient thereof by the current pressure difference error. The foregoing can be illustrated by the following equation:

$$GSF_i = GSF_{i-1} + K_c * \frac{(\varepsilon_i - \varepsilon_{i-1})}{t} + \frac{K_c}{\tau_I} * \varepsilon_i$$

where: $GSF_i$=Global speed factor where i denotes either a feed air or evacuation compressor; $GSF_{i-1}$=The previous stored value of the respective global speed factor, $K_c$ is the gain; $\varepsilon_i$ is the respective pressure difference error; $\varepsilon_{i-1}$ is the respective last stored value of the pressure difference error; $\tau_I$ is the integral reset time and t is the execution time interval of the control program. The values selected for each proportional gain and integral reset time can be the same, but are not necessarily the same, for each feed air and evacuation compressor. Thus, proportional-integral speed control is being exercised here and the "gain" and the "integral reset time" are simply known tuning factors that will be experimentally determined in a manner known in the art.

The total speed multiplier for both feed air and evacuation compressors is calculated in step 54 and 59, respectively, by multiplying the feedback speed multiplier determined in either steps 43 or 44 by the feed forward multiplier determined in either steps 48 or 49 and the global speed factor, which may have been recalculated in step 53 or 58 if either step 5 or step 11 of the vacuum pressure swing process just terminated. An adjusted optimal speed for each compressor is then calculated in logic block 60 or 61 by multiplying the respective optimal speeds calculated in step 37 by the respective total speed multipliers ("$SM_\gamma$") to obtain an adjusted speed. This adjusted speed is then used to set the speed in the variable frequency drives 12 and 13 as shown in step 62 and 63, respectively. In this regard, the controller 14, in response to the value of the adjusted speed determined by the control program, generates the control signal passed from the controller 14 to VFD 12 and 13 that is referable to such adjusted speed. This control signal will then serve as an input that would revise the speed set in variable frequency drive 12 or 13. Another possibility would be for the variable frequency drive being programmed to read the output of adjusted speed that is generated by the controller 14. In any case, the programming proceeds to the next execution thereof after the elapse of the re-occurring execution time by looping back to execution step 34.

With reference again to FIG. 2, the strategy behind the speed control of the present invention is basically to obtain a speed based upon pressure ratio that will in most cases operate the compressors 4 and 5 upon their peak efficiency operating line shown in FIG. 3, while simultaneously ensuring the cyclic vacuum pressure swing process occurs between the set points for target highest adsorption pressure and target lowest desorption pressure. Specifically, at the conclusion of the step 5 and step 11 in the vacuum pressure swing adsorption process, the pressure ratio developed across the evacuation compressor 5 will be, in the embodiment described herein, about 2. The adsorbent bed will, however, be at a negative gauge pressure with regard to ambient. As equalization gas flows into adsorption beds 2 or 3 from the other bed, the bed pressure of the bed receiving the equalization gas rises rapidly from the evacuation with product purge step in which the bed has been evacuated to remove the nitrogen and conclude regeneration of the adsorbent. However, as far as the pressure ratio across the compressor 5 is concerned, during at least a portion of the pressure rise, power will be removed from the permanent magnet motor 11 and as shown, in FIG. 2, now power is being applied for part of the step and the speed of the compressors 4 and 5 are decelerating. During the equalization with feed pressurization step, pressurization continues with product gas and a point is reached in which the pressure ratio as sensed by pressure transducers 16 and 15 increases due to the increase in bed pressure such that the speed of the compressor 4 must be increased to maintain operation along the peak efficiency operating line as shown in FIG. 3. During either of these steps, if the compressor 4 does not accelerate quickly enough the flow rate through the compressor as sensed by pressure transducers 16 and 17 may not be sufficient to avoid surge. In such case, this would be a situation in which an affirmative answer for the test in program execution block 42 would be in the affirmative and a feedback multiplier would be computed that necessarily increase the speed of the compressor to avoid surge. As steps 3, 4 and 54 for bed 2, or likewise steps 9, 10 and 11 for bed 3 take place, the pressure ratio across the compressor 4 increases due to the increase in bed pressure. The compressor therefore, speeds up to obtain the increase along the peak efficiency operating line. At such time, it is unlikely that the compressor will be at a mass flow anywhere near a condition at which surge would occur; and the inquiry in block 42 would be answered in the negative. This would result in a reduction of compressor speed back towards the peak efficiency operating line by either further reducing the feedback speed multiplier with the proportionality constant if the last value were 1.0 or greater or by reducing the speed further with the last value of the feedback speed multiplier.

After the conclusion of the feed with provide purge step, the adsorbent bed needs to be regenerated. At this point equalization gas is allowed to escape from the adsorbent bed 2 into adsorbent bed 3 if the process is in step 6, or from adsorbent bed 3 into bed 2 if the process is in step 12. The pressure ratio falls rapidly and preferably, as described above, the variable frequency drive 13 reacts to the control signal provided from controller 14 and referable to the nonoperational speed produced in logic block 39 and ceases to apply power to the permanent magnet motor 11. Given that the motor is unloaded it is unlikely that a surge event would occur. However, at the beginning of step 1 or 7, the compressor 5 is acting as a vacuum pump and as the pressure decreases within adsorbent bed 3 or 2, respectively, the pressure ratio starts to rise. If the mass flow through the compressor is not sufficient, surge could occur. However, now an aggressive feed forward speed multiplier is calculated with the aid of FIG. 6. As the pressure ratio increases across the compressor as measured by pressure transducers 19 and 18, the feed forward speed multiplier increases to a peak value at a pressure ratio of about 1.7. This pressure ratio is experimentally determined to be that pressure ratio at which surge is likely to occur and the feed forward speed multiplier is selected to be that value that will sufficiently increase the speed of the compressor to avoid surge. As the bed pressure further decreases due to the evacuation of the adsorbent bed, the pressure ratio further increases. However, the feed forward speed multiplier decreases. The reason for this is that the motor and compressor combination will not react immediately due to aerodynamic drag and inertial effects. Consequently, as the pressure ratio increases, the speed of the compressor is gradually increased and after the peak, the speed is gradually decreased to allow the compressor to decelerate and return to peak efficiency so that the next step 6 or 12 can take place at which power to the permanent magnet motor is removed.

Figure 6:
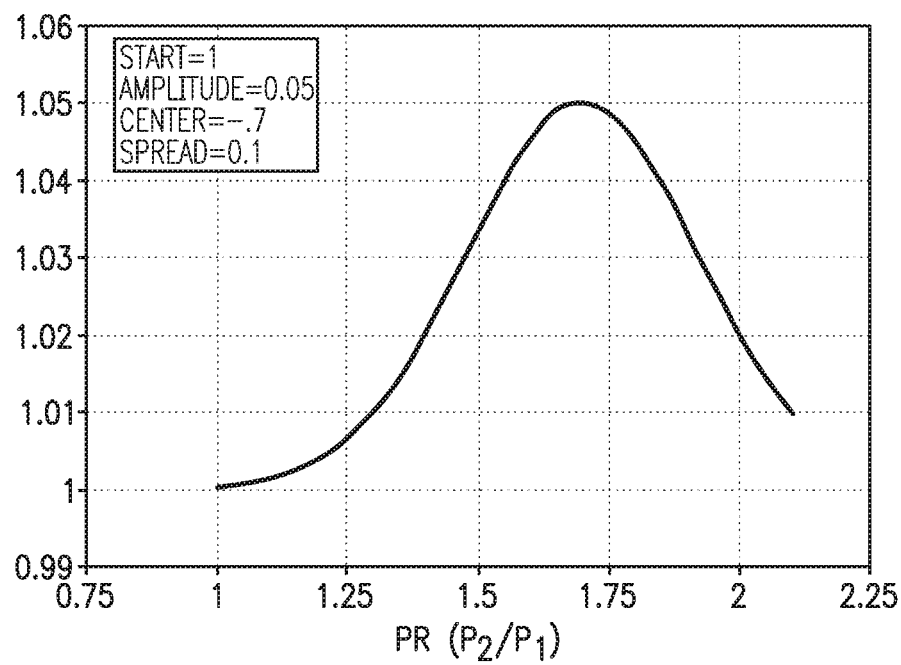
FIG. 6 is a Gaussian curve of a feed forward speed multiplier used in control programming of the controller employed in FIG. 1.

With specific reference to FIG. 6, preferably the response of the feed forward speed multiplier is obtained with a Gaussian function in which the feed forward speed multiplier is given by the equation:

$$\text{START} + \text{Amplitude}^{[F/spread]};$$

where $F=(P_2/P_1-\text{Center})$. "Start" will shift the curve shown in FIG. 4 up or down, "Amplitude" will move the peak up or down. "Center" will shift the pressure ratio where the peak occurs and "Spread" controls the rate at which the curve fans out from the center. Thus, the curve itself could be programmed within the control program or data points within a look up table could likewise be programmed. This being said, rather than the illustrated Gaussian curve, the curve could be triangular. Less preferred, but possible, would just be to use the peak of the curve for the feed forward speed multiplier. Likewise, it would be possible to use a fixed factor of increase for the feedback speed multiplier so that the compressor speed would be increased if the flow rate through the compressor dropped below an allowable point and reduced by a fixed factor if the flow rate remained above the allowable point. Why neither of these are preferred is that a greater percentage of operation of the compressor will be off the peak efficiency operating line and therefore, the apparatus 1 will consume more power.

As mentioned above, the programming of the variable frequency drive 12 or 13 to remove power at very low speeds is also optional, but as could be appreciated, such operation also saves power. All of the foregoing being said, it is possible to conduct an embodiment of the present invention in which power is never removed from the motors 10 or 11. In other words, an embodiment without programmable stages 38 through 41. However, if power to the motor were not disabled, then the variable frequency drives 12 and 13 will attempt to ramp down the speed along a preprogrammed path by imputing power to the motors 10 and 11, respectively, thus consuming more power. However, at the very least, the present invention does contemplate programming logic of the type shown in the subsequent logic blocks 45-63 where compressors 4 and 5 are at least likely to encounter surge operational conditions, namely, in the present cycle, part of step 2 where pressure ratio across the compressor 4 is rising and thus, power needs to be applied to permanent magnet motor 10, steps 3-5 for the feed air compressor and steps 8-11 for the evacuation compressor.

With specific reference again to FIG. 1, although it is contemplated that both the feed air compressor 4 and the evacuation compressor 5 both be centrifugal compressors that are subject to surge, it is possible that the feed compressor 4 be formed by a positive displacement blower or air pump, preferably of the Roots-type. The acceleration and deceleration characteristics of such a compressor, if not running at constant rotational speed, would be quite different from those of a centrifugal compressor and such a compressor would not be subject to surge in the same manner as the centrifugal compressors 4 and 5 of the vacuum pressure swing apparatus 1 shown in FIG. 1. In such case, feed compressor 4 would not require the surge avoidance control that would be required for a centrifugal compressor. However, evacuation compressor 5 will in any case be a centrifugal compressor and therefore, be subject to surge. In this regard, the control strategy shown for control of the evacuation compressor 5 would in many respects be identical to that shown in FIG. 4.

Although, the present invention has been discussed with reference to a two-bed vacuum pressure swing adsorption cycle wherein a single compressor acts as a feed compressor for both beds and a second compressor acts as an evacuation compressor for both beds, one of ordinary skill would recognize that one could use a single centrifugal compressor for both feed compression and evacuation roles for each bed, and/or that one could use more than two beds. In such embodiment of the present art, it is clear from the most description of the preferred embodiment that any compressor which is being used for evacuation may experience such additional risk for surge associated with the onset of power delivery to the permanent magnet motor, as occurs for the evacuation compressor 5 of apparatus 1 during steps 1 and 7 of the cyclic pressure swing process described herein. For any such compressor in this evacuation service, calculation and use of the feed forward factor as described in program blocks 47-49 of the programmable control diagram of FIG. 4 is necessary for avoidance of surge conditions.

While the present invention has been described with reference to a preferred embodiment as will occur to those skilled in the art, numerous, changes, additions and omission can be made without departing from the spirit and scope of the invention as set forth in the appended claims.

We claim:

1. A method of controlling centrifugal compressor speed in a vacuum pressure adsorption process comprising a vacuum pressure swing adsorption apparatus wherein said process comprises a feed with provide purge step, a pure evacuation step, and an evacuation with product purge step and wherein said apparatus comprises at least one adsorbent vessel and two or more centrifugal compressors each directly driven by an electric motor having its speed controlled by a variable frequency drive and each having a peak efficiency operating line, wherein each of and two or more centrifugal compressors has an inlet configured to receive a fluid stream at a flow rate and an outlet configured to discharge a pressurized fluid stream at a flow rate, and each of said two or more centrifugal compressors is configured to pressurize and/or evacuate the vacuum pressure swing adsorption apparatus, said method comprising:

measuring and calculating the flow rate of the fluid stream entering the inlet of each of said two or more centrifugal compressors;

measuring and calculating the pressure of the pressurized fluid stream at the outlet of each of said two or more compressors and the pressure of the fluid stream at the inlet of each of said two or more compressors and calculating a pressure ratio of outlet to inlet pressure for each of said two or moe centrifugal compressors;

determining an optimal speed for each of said two or more centrifugal compressors based on the pressure ratio that lies along the peak efficiency operating line of each of said two or more centrifugal compressors;

determining a minimum allowable flow rate of the fluid stream passing through each of said two or more centrifugal compressor at which surge conditions can occur at the optimal speed;

determining a feedback multiplier that when multiplied by the optimal speed will either increase the speed when the flow rate passing through each of said two or more centrifugal compressors is less than the minimum allowable flow rate or will reduce the speed when the flow rate passing through each of said two or more centrifugal compressors is greater than or equal to the minimum allowable flow rate;

setting a target highest adsorption pressure set point for said at least one adsorption vessel, during steps of a repeating cycle conducted by the vacuum pressure swing adsorption apparatus where each of said two or more centrifugal compressors is least likely to encounter surge conditions, other than the pure evacuation step and the evacuation with product purge step thereof, setting a total speed multiplier equal to the product of the feedback multiplier and a global speed factor, wherein the global speed factor is determined at the termination of the feed with provide purge step which, when multiplied by the optimal speed, will increase the speed of each of said two or more centrifugal compressors pressurizing the vacuum pressure swing adsorption apparatus when the highest pressure obtained is less than target highest adsorption pressure set point and decrease the speed of each of said two or more centrifugal compressors pressurizing the vacuum pressure swing adsorption apparatus when the highest pressure obtained is greater target highest adsorption pressure set point;

during the pure evacuation step and the evacuation with product purge step, calculating a feed forward multiplier that will increase the speed during the pure evacuation step and the evacuation with product purge step such that each of said two or more centrifugal compressors evacuating the vacuum pressure swing adsorption apparatus is not likely to enter the surge conditions;

setting a lowest target desorption set point for each of said at least one adsorption vessel;

determining a vacuum global speed factor at the termination of the evacuation with product purge step which, when multiplied by the optimal speed, will decrease the speed of each of said two or more centrifugal compressors evacuating the vacuum pressure swing adsorption apparatus when the lowest pressure obtained is less than the target lowest desorption pressure set point and increase the speed of each of said two or more centrifugal compressors evacuating the vacuum pressure swing adsorption apparatus when the lowest pressure obtained is greater than the target lowest desorption pressure set point;

determining a feed global speed factor at the termination of the evacuation with product purge step that, when multiplied by the optimal speed, will increase the speed of each of said two or more centrifugal compressors pressurizing the vacuum pressure swing adsorption apparatus when the highest pressure obtained is less than the target highest adsorption pressure set point and decrease the speed of each of said two or more centrifugal compressors pressurizing the vacuum pressure swing adsorption apparatus when the highest pressure obtained is greater than the target highest adsorption pressure set point;

calculating a feed total speed multiplier for each of said two or more centrifugal compressors pressurizing the vacuum pressure swing adsorption apparatus by multiplying the feedback multiplier, feed forward multiplier, and feed global speed factor together;

calculating a vacuum total speed multiplier for each of said two or more centrifugal compressors evacuating the vacuum pressure swing adsorption apparatus by multiplying the feedback multiplier, feed forward multiplier, and vacuum global speed factor together;

calculating an adjusted speed for each of said two or more centrifugal compressors pressurizing the vacuum pressure swing adsorption apparatus and each of said two or more centrifugal compressors evacuating the vacuum pressure swing adsorption apparatus by multiplying the optimal speed by the feed total speed multiplier or vacuum total speed multiplier, respectively; and generating a control signal referable at least to the adjusted speed for each each of said two or more centrifugal compressors and inputting the control signal into the variable frequency drive for each of said two or more centrifugal compressors such that the electric motor for each of said two or more centrifugal compressors operates at the adjusted speed.

2. The method of claim 1, wherein:
the vacuum pressure swing adsorption process utilizes a feed compressor for feeding compressed gas to the adsorption beds of the vacuum pressure swing adsorption apparatus and an evacuation compressor for evacuating gases from the adsorption beds; wherein said feed and evacuation compressors are both centrifugal compressors.

3. The method of claim 1, wherein:
the vacuum pressure swing adsorption process comprises two or more centrifugal compressors, wherein each of said compressors is configured to feed compressed gas to each adsorbent bed and to evacuate gases from each adsorbent bed.

4. The method of claim 2, wherein:
the repeating cycle includes a falling pressure equalization step and a rising pressure equalization step subsequent to the evacuation with product purge step;
during the falling pressure equalization step and the rising pressure equalization step, the control signal is referable to a non-operational speed such that electrical power is not applied to the electric motor driving the evacuation compressor; and
when a predetermined pressure ratio is obtained during the falling pressure equalization step, the control signal is referable to the adjusted speed such that the evacuation compressor operates at the adjusted speed.

5. The method of claim 1, wherein:
each time the feedback multiplier is determined, the feedback multiplier is stored;
when the flow rate is less than the minimum allowable flow rate of the fluid stream passing through each centrifugal compressor at which surge conditions can occur at the optimal speed, the feedback multiplier is determined by adding to a last stored value of the back multiplier a speed correction factor; and
when the flow rate through each centrifugal compressor is greater than or equal to the flow rate at which surge conditions can occur at the optimal speed, the feedback speed multiplier is calculated by dividing the last stored value of the feedback multiplier by a proportionality constant, the proportionality constant set equal to a value greater than 1.0 when the last stored value of the feedback multiplier is greater than or equal to 1.0 or 1.0 when the last stored value of the feedback multiplier is less than 1.0.

6. The method of claim 1, wherein:
the feed forward multiplier is a function of the pressure ratio;
the function having a maximum value of the feed forward multiplier at a predetermined pressure ratio at which or directly before which the surge conditions will likely occur during a transition between the evacuation step and the purge step and decreasing values of the feed forward multiplier at pressure ratios greater than or less than maximum value; and
the maximum valve has a magnitude preselected such that when the maximum valve is multiplied by the optimal speed at the predetermined pressure ratio the resulting speed will prevent surge conditions from occurring.

7. The method of claim 6, wherein the function is a Gaussian function.

8. The method of claim 1, wherein the minimum allowable flow rate of the fluid stream passing through each centrifugal compressor is calculated by measuring the pressure difference at two points in a shroud of the centrifugal compressor and that are successively closer to an impeller thereof.

9. The method of claim 5, wherein:
the minimum allowable flow rate of the fluid stream passing through each centrifugal compressor is calculated by measuring the pressure difference at two points in the shroud of the centrifugal compressor that are successively closer to the impeller thereof at different time intervals;
wherein during each of the time intervals, a pressure difference error is calculated and stored by subtracting the minimum allowable flow rate of the fluid stream passing through each centrifugal compressor at which surge conditions can occur at the optimal speed from the current value of the pressure difference; and
the speed correction factor of the feedback multiplier is calculated during each of the time intervals through proportional integral control comprising adding a proportional term to an integral term, wherein the proportional term is calculated by multiplying a gain factor by a difference between the pressure difference error and a prior pressure difference error calculated in a prior time interval and dividing the difference by the time interval and wherein the integral term is calculated by dividing the gain factor by an integral reset time and multiplying ea resultant quotient thereof by the pressure difference error.

10. The method of claim 8, wherein:
the feed forward multiplier is a Gaussian function of the pressure ratio;
the Gaussian function having a maximum value of the feed forward multiplier at a predetermined pressure ratio at which or directly before which the centrifugal compressor will likely enter surge conditions during transition between the evacuation step and the purge step and decreasing values of the feed forward multiplier at pressure ratios greater than or less than maximum value; and
the maximum valve has a magnitude preselected such that when the maximum valve is multiplied by the optimal speed at the predetermined pressure ratio the resulting speed will prevent the centrifugal compressor from entering surge conditions.

11. The method of claim 1, wherein:
each time the feed global speed factor multiplier is determined, the global speed factor multiplier is stored;
when the absolute difference between the measured pressure in the vacuum pressure swing adsorption apparatus at the end of the feed with provide purge step and the target highest adsorption pressure is greater than the minimum allowable tolerance which is set at +/−2 inches of water, the feed global speed factor multiplier is determined by adding to the last stored value of the feed global speed factor multiplier, a feed global speed factor correction factor; and
when the absolute difference between the measured pressure in the vacuum pressure swing adsorption apparatus at the end of the feed with provide purge step and the target highest adsorption pressure is less than the minimum allowable tolerance of +/−2 inches of water, the feed global speed factor multiplier is set equal to the last stored value of the feed global speed factor multiplier.

12. The method of claim 1, wherein:
each time the vacuum global speed factor multiplier is determined, the global speed factor multiplier is stored;
when the absolute difference between the measured pressure in the vacuum pressure swing adsorption apparatus at the end of the evacuation with product purge step and the target lowest desorption pressure is greater than the minimum allowable tolerance, which is set at +/−2 inches of water, the vacuum global speed factor multiplier is determined by adding to last stored value of the vacuum global speed factor multiplier, a vacuum global speed factor correction factor; and
when the absolute difference between the measured pressure in the vacuum pressure swing adsorption apparatus at the end of the evacuation with product purge step and the target lowest desorption pressure is less than the minimum allowable tolerance of +/−2 inches of water, the vacuum global speed factor multiplier is set equal to the last stored value of the vacuum global speed factor multiplier.

13. A control system for controlling centrifugal compressor speed in a vacuum pressure adsorption process comprising a vacuum pressure swing adsorption apparatus, wherein said process comprises a feed with provide purge step, pure evacuation step and an evacuation with product purge step and wherein said apparatus comprises at least one adsorbent vessel having an adsorption bed having a target highest adsorption pressure and a target lowest desorption pressure, and at least one centrifugal compressor directly driven by an electric motor having a speed controlled by a variable frequency drive and having a peak efficiency operating line, wherein the at least one centrifugal compressor has an inlet configured to receive a fluid stream at a flow rate and an outlet configured to discharge a pressurized fluid stream at a flow rate, said control system comprising:
means for sensing the flow rate of gas entering the at least one centrifugal compressor;
pressure transducers positioned to sense pressure at the inlet and the outlet of said at least one centrifugal compressor;
pressure transducers positioned to sense pressure at the adsorption bed of a vacuum pressure swing adsorption apparatus;
a controller responsive to the flow rate sensing means, the pressure transducers positioned to sense pressure at the inlet and the outlet of said at least one centrifugal compressor, the pressure transducers positioned to sense pressure at the adsorption bed of the vacuum pressure swing adsorption apparatus and steps of a repeating cycle conducted by the vacuum pressure swing adsorption apparatus, wherein said controller comprises a control program programmed to:
calculate a pressure ratio of the pressures of the outlet to inlet of said at least one centrifugal compressor;
determine an optimal speed for said at least one centrifugal compressor based on the pressure ratio that lies along the peak efficiency operating line for said at least one centrifugal compressor;
determine a minimum allowable flow rate of the fluid stream passing through said at least one centrifugal compressor at which surge conditions are likely to occur at the optimal speed;
determine a feedback multiplier that when multiplied by the optimal speed will either increase the speed when the flow rate is less than the minimum allowable flow rate or will reduce the speed when the flow rate is greater than or equal to the minimum allowable flow rate;
determine a feed global speed factor at the termination of the feed with provide purge step that, when multiplied by the optimal speed, will increase the speed of said at least one centrifugal compressor pressurizing the vacuum pressure swing adsorption apparatus when the highest pressure measured in the adsorption bed of the vacuum pressure swing adsorption apparatus being pressurized during the feed with provide purge step is less than the target highest adsorption pressure, and decrease the speed of said at least one centrifugal compressor pressurizing the vacuum pressure swing adsorption apparatus when the highest pressure measured in the adsorption bed of the vacuum pressure swing adsorption apparatus being pressurized during the feed with provide purge step is greater than the target highest adsorption pressure;
calculating a feed forward multiplier during the pure evacuation step and the evacuation with product purge step that will increase the speed of said at least one compressor during the pure evacuation step and the evacuation with product purge step such that said at least one compressor is not likely to enter the surge conditions;
determine a vacuum global speed factor multiplier at the termination of the evacuation with product purge step which, when multiplied by the optimal speed, will decrease the speed of said at least one centrifugal compressor evacuating the vacuum pressure swing adsorption apparatus when the lowest pressure measured in the adsorption bed of the vacuum pressure swing adsorption apparatus being evacuated during the evacuation with product purge step is greater than the target lowest desorption pressure, and increase the speed of said at least one centrifugal compressor evacuating the vacuum pressure swing adsorption apparatus being evacuated when the lowest pressure measured in the adsorption bed of the vacuum pressure swing adsorption apparatus during the evacuation with product purge step is greater than the target lowest desorption pressure;

set a vacuum total speed multiplier equal to the mathematical product of the feedback multiplier and a feed global speed factor during the steps of the repeating cycle where said at least one centrifugal compressor is least likely to enter surge conditions, other than the pure evacuation step and the evacuation with product purge step thereof;

set a vacuum total speed multiplier equal to mathematical product of the feedback multiplier, the feed forward multiplier, and vacuum global speed factor multiplier during the pure evacuation step and the evacuation with product purge step, that will increase the speed of said at least one compressor such that said at least one centrifugal compressor is not likely to enter the surge conditions;

set a feed total speed multiplier equal to the mathematical product of the feedback multiplier and feed global speed factor; and calculate an adjusted speed for said at least one centrifugal compressor pressurizing the vacuum pressure swing adsorption apparatus and said at least one centrifugal compressor evacuating the vacuum pressure swing adsorption apparatus by multiplying the optimal speed by the feed total speed multiplier and vacuum total speed multiplier, respectively; and the controller configured to generate a control signal in response to the control program and able to serve as an input into the variable frequency drive such that speed of the electric motor for said at least one centrifugal compressor is controlled in response to the control signal, the control signal referable at least to the adjusted speed such that the electric motor and therefore, said at least one centrifugal compressor operates at the adjusted speed.

14. The control system of claim 13, wherein:
the vacuum pressure swing adsorption apparatus utilizes a feed compressor for feeding compressed gas to each of the adsorption beds of the vacuum pressure swing adsorption apparatus and an evacuation compressor used in evacuating gases from each of the adsorption beds; wherein
the feed compressor and the evacuation compressor are both centrifugal compressors.

15. The control system of claim 14, wherein:
the repeating cycle includes a feed with equalization step subsequent to the evacuation with product purge step, a feed with product repressurization step following the feed with equalization step and an equalization step prior to the pure evacuation step;
the control program is programmed to produce a non-operational speed at which the variable frequency drive will remove electrical power from the electric motor and the control signal is referable to the non-operational speed when produced by the control program;
during the feed with equalization step, the equalization step and initiation of the feed with product repressurization step, the control program produces the non-operational speed such that when the control signal is inputted into the variable frequency drive, electrical power is not applied to the electric motor; and
the control program also programmed such that when a predetermined pressure ratio of the pressure ratio is obtained during the feed with product repressurization step, the control signal is again referable to the adjusted speed such that the electric motor and therefore, the compressor operates at the adjusted speed.

16. The control system of claim 14, wherein:
the repeating cycle includes a falling pressure equalization step and a rising pressure equalization step subsequent to the evacuation with purge step;
the control program is programmed to produce a non-operational speed at which the variable frequency drive will remove electrical power from the electric motor and the control signal is referable to the non-operational speed when produced by the control program;
during the falling pressure equalization step and the rising pressure equalization step, the control program produces the non-operational speed such that when the control signal is inputted into the variable frequency drive, electrical power is not applied to the electric motor driving the evacuation compressor; and the control program also programmed such that when a predetermined pressure ratio of the pressure ratio is obtained during the falling pressure equalization step, the control signal is again referable to the adjusted speed such that the electric motor and therefore, the evacuation compressor operates at the adjusted speed.

17. The control system of claim 13, wherein the control program is programmed such that:
each time the feed back multiplier is determined, the feed back multiplier is stored;
when the flow rate through each centrifugal compressor is greater than or equal to the minimum allowable flow rate at which surge conditions can occur at the optimal speed parameter is less than the minimum allowable value, the feed back multiplier is determined by adding to a last stored value of the feed back multiplier, a speed correction factor; and
when the flow rate through each centrifugal compressor is greater than or equal to the minimum allowable flow rate at which surge conditions can occur at the optimal speed, the feedback speed multiplier is determined by dividing the last stored value of the feedback multiplier by a proportionality constant, the proportionality constant set equal to a value greater than 1.0 when the last stored value of the feedback multiplier is greater than or equal to 1.0 or 1.0 when the last stored value of the feedback multiplier is less than 1.0.

18. The control system of claim 13, wherein the control program is programmed such that:
the feed forward multiplier is a function of the pressure ratio;
the function having a maximum value of the feed forward multiplier at a predetermined pressure ratio at which or directly before which the centrifugal compressor will likely enter surge conditions during a transition between the evacuation step and the purge step and decreasing values of the feed forward multiplier at pressure ratios greater than or less than maximum value; and
the maximum valve has a magnitude preselected such that when the maximum valve is multiplied by the optimal speed at the predetermined pressure ratio the resulting speed will prevent the centrifugal compressor from entering surge conditions.

19. The control system of claim 18, wherein the function is a Gaussian function.

20. The control system of claim 13, wherein:
the flow rate sensing means comprises two further pressure transducers situated at two points in the shroud of the centrifugal compressor that are successively closer to the impeller thereof;
the control program is programmed to calculate the pressure difference from pressure measured by the two further pressure transducers; and
the flow rate is calculated from the pressure difference.

21. The control system of claim 17, wherein:
the flow rate sensing means comprises two further pressure transducers situated at two points in the shroud of the centrifugal compressor that are successively closer to the impeller thereof;
the control program is programmed to calculate a pressure difference from pressure measured by the two further pressure transducers;
the flow rate is calculated from the pressure difference; and
the control program is programmed such that;
during each of the time intervals, a pressure difference error is calculated and stored by subtracting the minimum allowable value from the current value of the pressure difference; and
a speed correction factor of the feed back multiplier is calculated during each of the time intervals through proportional integral control comprising adding a proportional term to an integral term, the proportional term calculated by multiplying a gain factor by a difference between the pressure difference error and a prior pressure difference error calculated in a prior time interval and dividing the difference by the time interval and the integral term calculated by dividing the gain factor by an integral reset time and multiplying a resultant quotient thereof by the pressure difference error.

22. The control system of claim 21, wherein the control program is programmed such that:
the feed forward multiplier is a Gaussian function of the pressure ratio;
the Gaussian function having a maximum value of the feed forward multiplier at a predetermined pressure ratio at which or directly before which the centrifugal compressor will likely enter surge conditions during a transition between the evacuation step and the purge step and decreasing values of the feed forward multiplier at pressure ratios greater than or less than maximum value; and
the maximum value has a magnitude preselected such that when the maximum value is multiplied by the optimal speed at the predetermined pressure ratio the resulting speed will prevent the centrifugal compressor from entering surge conditions.

23. The control system of claim 13, wherein the control program is programmed such that:
each time the vacuum global speed factor is determined, the vacuum global speed factor is stored;
when the difference between the measured pressure and the target lowest desorption pressure set point is greater than the allowable tolerance, the vacuum global speed factor is determined by adding to a last stored value of the vacuum global speed factor, a vacuum global speed correction factor; and
when the difference between the measured pressure and the target lowest desorption pressure set point is less than or equal to a pressure tolerance of +/−2 inches of water, the vacuum global speed factor is determined to be the last stored value of the vacuum global speed factor.

24. The control system of claim 23, wherein the vacuum global speed factor is calculated through proportional integral control comprising adding a proportional term to an integral term, the proportional term calculated by multiplying a gain factor by a difference between the measured pressure and the target lowest desorption pressure set point and the prior difference between the measured pressure and the target lowest desorption pressure set point calculated in the prior time interval and dividing the difference by the time interval and the integral term calculated by dividing the gain factor by an integral reset time and multiplying a resultant quotient thereof by the difference between the measured pressure and the target lowest desorption pressure set point.

25. The control system of claim 13, wherein the control program is programmed such that:
each time the feed global speed factor is determined, the feed global speed factor is stored;
when the difference between the measured pressure and the target highest adsorption pressure set point is greater than an allowable tolerance of +/−2 inches of water, the feed global speed factor is determined by adding to a last stored value of the feed global speed factor to a feed global speed correction factor; and
when the difference between the measured pressure and the target highest adsorption pressure set point is less than or equal to a tolerance of =/−2 inches of water, the feed global speed factor is determined to be the last stored value of the feed global speed factor.

26. The control system of claim 25, wherein the feed global speed factor is calculated through proportional integral control comprising adding a proportional term to an integral term, the proportional term calculated by multiplying a gain factor by the difference between the measured pressure and the target highest adsorption pressure set point and a prior difference between the measured pressure and the target highest adsorption pressure set point calculated in the prior time interval and dividing the difference by the time interval and the integral term calculated by dividing the gain factor by an integral reset time and multiplying a resultant quotient thereof by the difference between the measured pressure and the target highest adsorption pressure set point.

\* \* \* \* \*